(12) United States Patent
Zatvornytskyi et al.

(10) Patent No.: US 12,579,815 B2
(45) Date of Patent: Mar. 17, 2026

(54) VIDEO SURVEILLANCE SYSTEM

(71) Applicant: MILESTONE SYSTEMS A/S,
Brøndby (DK)

(72) Inventors: Oleksii Zatvornytskyi, Brøndby (DK);
Peter Posselt Vergmann, Brøndby
(DK)

(73) Assignee: MILESTONE SYSTEMS A/S,
Brøndby (DK)

( * ) Notice: Subject to any disclaimer, the term of this
patent is extended or adjusted under 35
U.S.C. 154(b) by 106 days.

(21) Appl. No.: 18/434,130

(22) Filed: Feb. 6, 2024

(65) Prior Publication Data

US 2024/0265704 A1 Aug. 8, 2024

(30) Foreign Application Priority Data

Feb. 7, 2023 (GB) ....................................... 2301681
Feb. 7, 2023 (GB) ....................................... 2301682

(51) Int. Cl.
| | |
|---|---|
| *G06V 20/52* | (2022.01) |
| *G06F 16/783* | (2019.01) |
| *G06F 16/787* | (2019.01) |
| *G06T 7/20* | (2017.01) |
| *G06T 7/70* | (2017.01) |

(52) U.S. Cl.
CPC .......... *G06V 20/52* (2022.01); *G06F 16/7837*
(2019.01); *G06F 16/787* (2019.01); *G06T 7/20*
(2013.01); *G06T 7/70* (2017.01)

(58) Field of Classification Search
CPC ... G06V 20/52; G06F 16/7837; G06F 16/787;
G06T 7/20; G06T 7/70; H04N 7/181
See application file for complete search history.

(56) References Cited

U.S. PATENT DOCUMENTS

| | | | | | |
|---|---|---|---|---|---|
| 4,241,456 | A | * | 12/1980 | Nakagaki ............... | G08C 23/04 |
| | | | | | 398/208 |
| 2002/0009978 | A1 | * | 1/2002 | Dukach ................... | G08G 1/01 |
| | | | | | 455/457 |
| 2002/0034067 | A1 | * | 3/2002 | Massaro ............... | A47F 5/0068 |
| | | | | | 361/728 |
| 2003/0136832 | A1 | * | 7/2003 | Massaro ................. | G09F 3/208 |
| | | | | | 235/383 |
| 2004/0195774 | A1 | * | 10/2004 | Segan .................. | G04B 47/048 |
| | | | | | 273/359 |
| 2006/0082642 | A1 | * | 4/2006 | Wang ..................... | H04N 7/142 |
| | | | | | 348/14.05 |
| 2007/0049159 | A1 | * | 3/2007 | Kulis, II ................ | A63H 17/28 |
| | | | | | 446/438 |
| 2007/0078566 | A1 | * | 4/2007 | Wang ..................... | A61B 34/70 |
| | | | | | 700/259 |
| 2007/0103890 | A1 | * | 5/2007 | Morehead ............ | A01K 27/006 |
| | | | | | 362/103 |

(Continued)

FOREIGN PATENT DOCUMENTS

GB 2384128 A 7/2003

*Primary Examiner* — Frank F Huang

(74) *Attorney, Agent, or Firm* — Canon U.S.A., Inc. IP
Division

(57) ABSTRACT

The present disclosure generally relates to video surveil-
lance systems and optionally computer-implemented video
management methods for video surveillance systems. A
video management system may be configured to dynami-
cally calculate the Field-of-View (FOV) of a video camera
using Geographic Information System (GIS) data.

20 Claims, 16 Drawing Sheets

(56)     References Cited

U.S. PATENT DOCUMENTS

| | | | |
|---|---|---|---|
| 2007/0228755 A1* | 10/2007 | Alvarado | B62D 41/00 |
| | | | 340/425.5 |
| 2007/0291128 A1* | 12/2007 | Wang | H04N 7/185 |
| | | | 901/1 |
| 2009/0125147 A1* | 5/2009 | Wang | G06T 7/0012 |
| | | | 715/764 |
| 2009/0262206 A1 | 10/2009 | Park | |
| 2010/0010672 A1* | 1/2010 | Wang | G05D 1/0242 |
| | | | 901/1 |
| 2013/0091432 A1 | 4/2013 | Shet | |
| 2019/0037179 A1 | 1/2019 | Rasheed | |
| 2019/0042868 A1 | 2/2019 | Oesterreicher | |
| 2020/0035030 A1 | 1/2020 | Schradin | |
| 2022/0017115 A1 | 1/2022 | Biala | |
| 2022/0020271 A1 | 1/2022 | Foley | |
| 2022/0078333 A1 | 3/2022 | Cui | |

* cited by examiner

505 — Receive FOV data and GIS data

510 — Determine adjusted FOV

515 — Store adjusted FOV

100c

600 — Start

605 — Receive video streams and metadata streams

610 — Receive field-of-view data

615 — Determine FOV of a selected camera

620 — Display video stream frame and associated geo-map

625 — Determine additional camera(s)

630 — Determine projected FOV

690 — End

605 — Receive video streams and metadata streams

610 — Receive field-of-view data

612 — Receive GIS data

615 — Determine FOV of a selected camera

616 — Determine adjusted FOV of the selected camera

620 — Display video stream frame and associated geo-map

625 — Determine additional camera(s)

690 — End

VIDEO SURVEILLANCE SYSTEM

CROSS REFERENCE

This application claims the benefit under 35 U.S.C 119 (a)-(d) of the United Kingdom Patent Application Nos. 2301682.7 and 2301681.9, both filed on Feb. 7, 2023, and both titled "VIDEO SURVEILLANCE SYSTEM"; these cited patent applications are incorporated herein by reference in their entirety.

TECHNICAL FIELD

The present disclosure generally relates to video surveillance systems and, optionally, computer-implemented video management methods for video surveillance systems.

BACKGROUND

Modern video surveillance systems have evolved into highly complex and often heterogeneous systems comprising a large number of different peripheral devices and computer hardware elements that are tied together via a networked infrastructure, and controlled by means of advanced management software. One important component of modern video surveillance systems is a video recording and processing system that allows video streams from one or more video cameras to be received, stored and processed.

A video management system (VMS), also known as video management software or a video management server, is a component or sub-system of a video surveillance system. The VMS typically provides various video management services, such as one or more of the following: collecting one or more video streams from one or more video cameras, storing the received one or more video streams to a storage device and providing an interface to view the received one or more live video streams and/or to access one or more stored video streams.

Further, a VMS may be configured to also handle other types of data besides video streams such as, but not limited to, audio streams, data from monitoring services such as motion detectors, fire alarms, etc.

Moreover, it is generally desirable that surveillance systems and, in particular, VMSs are versatile and can be used in different types of applications which may impose different demands or requirements to processing and displaying received video streams supplied by the one or more video cameras. Moreover, the demands and requirements imposed in a surveillance system may change over time.

A particular challenge to video surveillance systems and the VMS subsystem is to handle video streams supplied by moving or movable, i.e. non-stationary, video cameras during normal operation of video surveillance system. The movable video camera or cameras may move or travel through a geographical surveillance area and/or facilities like office buildings etc.

Another challenge for video surveillance VMS subsystems is the growing amount of data as devices recording data such as video cameras, microphones, and various detectors become ever more numerous.

SUMMARY

It is an object of at least some aspect described in the present disclosure to solve one or more of the challenges identified above and/or other circumstances associated with existing video surveillance systems, or at least to provide an alternative to known systems.

In a first aspect there is disclosed a video management system (VMS) comprising: a recording server configured for receiving and storing a plurality of metadata streams, the metadata streams being associated with a plurality of video streams, respectively, each video stream being supplied by, or associated with, respective ones of a plurality of video cameras; and a processing unit configured to receive data via a data communication interface. The processing unit being configured to: receive GIS data associated with the position of each camera; receive FOV data associated with the plurality of video streams; the FOV data comprising position data of each camera, an orientation of each camera, image sensor information of each camera, and lens information of each camera; and determine an adjusted FOV associated with each video stream, the determination being based on the FOV data and on the GIS data, where the adjusted FOV indicates unobscured FOV and/or limited-visibility FOV.

In a second aspect there is disclosed a video management system (VMS) comprising: a recording server configured for receiving and storing a plurality of video streams and associated metadata streams, each video stream being supplied by, or associated with, respective ones of a plurality of video cameras; a user interface (UI) client; and a processing unit configured to receive data via a data communication interface. The UI client of the second aspect being configured to: provide a graphical user interface (GUI); display, via the GUI, the video stream of a selected camera frame-by-frame; display, via the GUI, a geo-map, and display an icon representative of the selected camera on the geo-map at a camera map position. The processing unit of the second aspect being configured to: receive field-of-view (FOV) data associated with the plurality of video streams; the FOV data comprising position data of each camera, an orientation of each camera, image sensor information of each camera, and lens information of each camera; and determine the FOV of the selected camera at a time associated with the displayed video frame. Wherein in the second aspect the UI client is further configured to continuously update the geo-map according to the FOV of the selected camera such that the geo-map comprises at least the extent of the FOV of the selected camera. The video stream and the metadata stream associated with each video stream may each comprise timestamps, i.e. a digital record of time. This allows for time synchronization of the video streams and metadata streams received at the VMS.

Timestamps associated with metadata "frames" and timestamps associated with video frames may be separate such that a time synchronization is necessary in order to relate the frames to each other. For example, so as to be able to determine the FOV of the selected camera at a time associated with a displayed video frame. During time synchronization a given frame is related to a relevant frame from the other stream, i.e. for a given video frame a relevant metadata frame is coupled to it or for a given metadata frame a relevant video frame is coupled to it. The relevant video frame may be the one having a timestamp at or before the timestamp of a given metadata frame. Likewise, the relevant metadata frame may be the one having a timestamp at or before the timestamp of a given video frame. In some instances, the relevant frame is more appropriately chosen as the frame having a timestamp that is later than the timestamp of the given frame. Thus, the relevant frame may not be the frame having a timestamp closest to the timestamp of the given frame from the other stream. For example, it may be more suitable in a given scenario to relate a given frame from one stream to a frame from another stream having a timestamp at or before the timestamp of the given frame even though the frame that is closest in time is one having a later time stamp compared to that of the given frame.

In some cases, the timestamps of the frames in the metadata stream match the timestamps of the frames in the video stream exactly. This may occur when the metadata is generated based on an analysis as is well known to a skilled person. It may also occur when the metadata and video originate from the same source. However, when the video streams and the metadata streams originate from independent, although associated, sources, the frames will have entirely independent timestamps, e.g. a GPS device associated with a video camera may only be providing the position each second, whereas the associated video camera may be providing 25 video frames per second. Each video camera may further be associated with multiple metadata streams, which may each originate from an independent, but associated, source such that the associated metadata streams may comprise multiple sets of timestamps.

Thus, the FOV of a selected camera at a time associated with a displayed video frame from the selected camera may be determined following a time synchronization.

The FOV data or at least some of the FOV data may be provided is the metadata stream. The FOV data or at least some of the FOV data may be provided as metadata of the video stream.

Metadata may be obtained from different sources. Field-of-view (FOV) data is also metadata, i.e. data that describes and gives information about other data. The FOV data used in the determination of an adjusted FOV may for example be obtained from a driver, or from a setting, such as a default setting, or as metadata in a metadata stream associated with a video stream. The adjusted FOV may for example be determined using a default setting of the lens and/or using image sensor information obtained from a driver. In some embodiments, the FOV data is obtained, entirely or partially, by the VMS as a metadata stream supplied by, or associated with, the movable video camera form which the respective video stream was acquired. The position of a respective camera may be obtained from a camera-associated GPS unit or device.

The determined adjusted FOV may be added to the metadata stream for the respective camera, and may be stored as part of the metadata stream. The determined adjusted FOV may be stored in a metadata stream of its own. Each video camera in the plurality of video cameras may be associated with multiple metadata streams.

The GIS data may be a dataset stored in a suitable manner in a component within the VMS, for example in a GIS repository, or the GIS data may be obtained from a database external to the VMS.

The plurality of video cameras may comprise at least one movable video camera and optionally one or more stationary video cameras. In some embodiments, the plurality of video cameras comprises a plurality of movable video cameras. The movable video cameras may each travel along a path or trail within an area via mounting to any suitable support structure of a vehicle, for example motorized vehicles like cars, trucks, busses, trains, motorcycles etc. The movable video cameras may be moved or transported along the path or trail of the area by way of mounting on, or worn by, a person via a suitable support like a belt etc. The one or more optional stationary video cameras may be mounted on, or fixed to, various kinds of stationary structures like factory or office buildings, train stations, support structures, etc. and may be arranged at traffic roads or junctions or the like.

Metadata on the position and orientation of a camera together with metadata on the image sensor and lens information of the camera allows for the calculation of a theoretical FOV of the respective camera, i.e. the extent of the area within which the camera can observe the world at any given moment.

The image sensor and lens characteristics will provide information on the width and depth covered by the camera. While the image sensor and some characteristics of the lens of the camera usually does not change over time, the lens information will comprise both physical, i.e. fixed, characteristics of the lens, and the current, i.e. dynamic, zoom level. Thus, these characteristics provide the shape of the FOV of the camera.

The position and orientation of the camera may provide the information needed to determine where the camera is viewing from at a given time and in which direction.

The metadata for the orientation of each camera may comprise one or more of: compass direction, relative pan, and relative tilt.

In the determination of the adjusted FOV, structures described in the GIS data for the area covered by the FOV are used to remove obstructed parts of the FOV of the camera, or mark parts of the FOV of the camera as having limited visibility. That is, the part(s) of the FOV of the camera for which the line of sight is interrupted by one or more structures described in the GIS data can be accounted for by the FOV being adjusted to not include the areas beyond the interrupted line of sight or to mark one or more areas as having limited visibility. The determination of the adjusted FOV may be done using geometric intersection calculations to account for the structures described in the GIS for the area covered by the FOV.

A determination of the adjusted FOV may be made at each timestamp or whenever the position, lens characteristics, and/or orientation of the camera changes. For example, a determination of the adjusted FOV may be made whenever the position, lens characteristics, and/or orientation of the camera changes more than a minimum value of the position, lens characteristics, and/or orientation.

The determined adjusted FOV can advantageously be utilized in various ways, for example as a way to provide information on video coverage, e.g. on how much of an area is covered, or as a way to improve a search routine, e.g. by only searching in video streams from cameras that are able to possibly see an area of interest or by only listing camera with a relevant adjusted FOV for viewing of the video streams by a user. Thus, the system and method described herein facilitate finding a video stream of interest to the user.

The recording server may be further configured for receiving and storing the plurality of video streams with which the plurality of metadata streams is associated, respectively. The processing unit may be configured to store the plurality of video streams and respective metadata streams in a video data repository and in a metadata repository, respectively, and to retrieve the plurality of video streams and respective metadata streams from the video data repository and metadata repository, respectively, as discussed in further detail below with reference to the appended drawings.

The VMS may comprise means for receiving and storing the adjusted FOV for later retrieval. The determined adjusted FOV may be stored in the video data repository, the metadata repository, or in a repository separate from the video data and metadata repository. The processing unit may be configured to store the adjusted FOV stream in a suitable repository.

The processing unit may be configured to utilize one or more search criteria defined by a VMS operator, e.g. a user of the VMS, for a search of the plurality of video streams, and/or associated metadata streams and/or adjusted FOV. To initiate a search, the user may specify, for example, a certain time span and/or a certain geographical area. The user may additionally specify criteria related to identification within the plurality of video streams for identification of, for example, a target object, a target activity and/or a target incident.

The processing unit may be further configured to receive a search query comprising a target location or target area, and to search the adjusted FOV to identify a subset of the plurality of video streams for which the adjusted FOV comprises the target location or target area.

The processing unit may be further configured to receive a target time or a target time interval as part of the search query, and to perform the search with the further limitation that the target location or target area is comprised within the adjusted FOV at the target time or within the target time interval.

The processing unit may be further configured to receive at least one of: a target object, a target activity and a target incident as part of the search query, and to perform the search with the further limitation the target object and/or target activity and/or target incident is identified within the plurality of video streams and/or respective metadata.

Thus, the search may provide a time, from the time-stamps, at which a target object, and/or a target activity, and/or a target incident occurred at a position or within a geographic area. In some embodiments, the search can provide a position or an area at which a target object, and/or a target activity, and/or a target incident occurred at a given time or within a given time interval.

The processing unit may be further configured to perform the search in the identified subset of the plurality of video streams and/or respective associated metadata streams.

In the first aspect, the VMS may further comprise a user interface (UI) client configured to provide a graphical user interface (GUI), and wherein the UI is configured to display to a user via the GUI a geo-map.

A geo-map is a map of a geographical area. Preferably, the geographical area comprises the surveillance area or a selected area. That is to say that the geo-map may be of a selected area or surveillance area.

The selected area may comprise the target position or target area. The UI client may be configured to display to the user, via the GUI, search results. The search results may be of the identified subset of the plurality of video streams. The search results may be displayed as an icon or thumbnail on the geo-map, such icons or thumbnails may be considered search result icons or search result thumbnails.

The icon or thumbnail position on the geo-map is representative of the camera position from which the respective video stream within the subset was recorded.

The icon or thumbnail on the geo-map may be displayed adjacent to the respective positions of the search results for example by an arrow or similar pointer indicating a structure at the geo-map position in question such as a specific position or location on a road, street or highway, a factory or office building, a train or bus stations, a traffic junction etc. The VMS may be capable of refining initial search results, either automatically or under user control, by applying at least one supplementary search criterion to reduce the number of remaining search results, while the visualization on the geo-map of representative icons or thumbnails (that is search result icons or search result thumbnails) provides the user with an intuitive and fast way of identifying relevant search results on the geo-map for further exploration and analysis as needed.

The skilled person will understand that numerous types of visually distinguishing attributes may be associated with or added to the icons or thumbnails, for example, coloured borders, coloured objects, textual tags, etc.

An icon representative of the selected camera may be displayed on the geo-map at a camera map position, where the camera map position is a geographical position in the shown map. The camera map position may be the last known position of the selected camera, or the camera map position may be based on the reported position of the respective selected camera at a given time.

The UI client may be further configured to display on the geo-map the adjusted FOV of each camera. The UI client is further configured to display on the geo-map the adjusted FOV of each camera in the subset at a timestamp associated with the search result.

The UI client may continuously update the geo-map. The UI client may continuously update the geo-map such that the extent of the selected camera's FOV is comprised in the geo-map, i.e. such that the geographical area within the camera's FOV is comprised within the geo-map. The UI client continuously update the geo-map based on the adjusted FOV. The geo-map may at least comprise the extent of the FOV, adjusted FOV or projected FOV but be restrained by a predetermined value so as to not include the whole area.

The geo-map may be updated when the camera position or FOV data changes, such as when the camera position or FOV data changes, preferably by more than a pre-determined threshold. Alternatively, or additionally, the geo-map may be updated at pre-determined time intervals. Thus, the geo-map will follow the camera FOV to always show the user of the VMS the area, which the selected camera is in. Such a dynamic update means that the geo-map will show an area that is updated each time the FOV and/or position of the selected camera changes. This improves the user's awareness of the location and other features in the same area as the selected camera.

The UI client may be configured to display, on the geo-map, a pre-determined area extent in addition to the FOV of the selected camera and dynamically zoom in and out on the geo-map as the FOV of the selected camera changes, e.g. as the zoom of the selected camera increases, the geo-map will zoom out, and as the zoom of the selected camera decreases, the geo-map will zoom in. The pre-determined area extent may be selected by a user.

The UI client may be configured to centre the geo-map, for example to centre the geo-map relative to the FOV of the selected camera and/or such that the camera map position of the selected camera is always centered, for example at least along the horizontal axis of the geo-map. A plurality of centering options may be available for a user to choose from. An option may be to have the camera map position of the selected camera centered both horizontally and vertically. This centering option may work well with a geo-map display, where north in the map is always pointing up, i.e. towards the top of the display on which the GUI with the geo-map is running. Alternatively, the geo-map displayed may orient itself such that the central line-of-sight of the camera is pointing up, i.e. such that the bearing of the geo-map changes according to the orientation of the camera. Such a centering option may work well in a situation where the GUI is also showing the video stream in a frame at the same time as the geo-map is being shown, since this will provide a user with directions in the video and geo-map displays that are, to most users, well connected visually, i.e. left and right in the video are the same as in the geo-map, while forward and backward in the video are up and down, respectively, in the geo-map. Another option is to make the bearing of the geo-map dependent on the orientation of the camera, while also taking into consideration the dimensions of the geo-map layout. For example, if the layout of the geo-map view is a long and thin rectangle, e.g. with ratio 1:3, having the camera map position close to a side of the view, i.e. close to one of the shorter sides of the rectangle, with the camera oriented towards the opposite side may allow for the better view of what lies in the FOV in the area shown in the geo-map. The geo-map may be centred in the FOV of the selected camera, e.g. positioned at half of the width at half of the depth of the FOV of the selected camera.

In some embodiments, the UI client is further configured to display, on the geo-map, a graphical representation of the FOV of the selected camera. As the FOV of the selected camera changes, the graphical representation of the FOV on the geo-map is updated to reflect the change. The graphical representation of the FOV of the selected camera or each camera may correspond to the adjusted FOV for the selected camera or each camera.

The graphical representation of the FOV may comprise a first portion and a second portion. The first portion being the theoretical FOV, i.e. maximum FOV based on the FOV data. The second portion being the adjusted FOV. The second portion may be visually distinguishable from the first portion.

In another aspect there is disclosed a video surveillance system comprising: a plurality of video cameras arranged in a surveillance area and configured to generate respective video streams, wherein each camera of the plurality of video cameras comprise, or is associated with, a position detecting device and an orientation detecting device configured to add position metadata and orientation metadata, respectively, to each of the respective video streams; and a video management system (VMS) as disclosed herein.

In another aspect there is disclosed a computer-implemented video management method for a video management system (VMS), comprising steps:

a) receive, at a video management system, a plurality of metadata streams and associated with a plurality of video streams, respectively, each video stream being supplied by, or associated with, respective ones of a plurality of video cameras;

b) receive, at a processing unit comprised in the video management system, GIS data associated with the position of each camera, c) receive, by the processing unit, field-of-view (FOV) data associated with the plurality of video streams, d) determine, by the processing unit comprised in the video management system, an adjusted FOV associated with each video stream, the determination being based on the FOV data and on the GIS data, where the adjusted FOV indicates unobscured FOV and/or limited-visibility FOV.

The computer-implemented video management method may further comprise steps of:

e) receive, by the video management system, a search query comprising a target location or target area, f) search the adjusted FOV associated with each video stream to identify a subset of the plurality of video streams for which the adjusted FOV comprises the target location or target area.

The computer-implemented video management method may further comprise steps of:

g) receive a target time or a target time interval as part of the search query, h) perform the search with the further limitation that the target location or target area is comprised within the adjusted FOV at the target time or within the target time interval.

The computer-implemented video management method may further comprise steps of:

i) display a geo-map of a selected area comprising the target position or target area, j) display search results of the identified subset of the plurality of video streams as an icon or thumbnail on the geo-map, wherein the icon or thumbnail position on the geo-map is representative of the camera position from which the respective video stream within the subset was recorded.

The computer-implemented video management method may further comprise steps of:

k) display, in the geo-map, the adjusted FOV of each camera in the subset at a timestamp associated with the search result.

The processing unit may be further configured to determine a subset of the plurality of video cameras for which the position of the video camera is within the geographical area displayed in the geo-map and/or for which the FOV of the video camera is at least partially within the geographical area displayed in the geo-map.

The UI client may be further configured to display an icon on the geo-map representative of each camera in the subset at a respective camera map position.

Thus, the geo-map may be configured to have icons representing a geographical position of other cameras, i.e. cameras other than the selected camera, within the geographical area displayed in the geo-map. Additionally, the geo-map may also have icons representing the geographical position of other cameras having a FOV that lies at least partially within the geographical area displayed in the geo-map. Thus, the geo-map may provide information on other cameras that are positioned outside the area shown in the geo-map, but for which the FOV extends into the area. The icon of such cameras positioned outside the area of the geo-map may be positioned e.g. on the edge of the geo-map that is closest to what would be the camera map position of that camera. Alternatively, or additionally, the icon representing a camera positioned outside the area of the geo-map may have an arrow, or other indicator, pointing towards the camera map position of that camera.

The UI client may be further configured to display, on the geo-map, a graphical representation of the FOV within the geo-map of each camera.

The selected camera may be selected by e.g. a process or a user. For example, the UI client may be configured to receive user input provided by a user, the user input comprising a selected one of the plurality of video cameras. A process that selects a camera may be a process responding to an incident, for example a process that responds to an alarm being triggered, or a process that is part of a search. In some embodiments, the UI client is further configured to display, on the geo-map, a user-activatable button associated with each of the cameras in the subset of the plurality of video cameras, wherein activating a button selects the associated camera in the subset, and wherein, optionally, the user-activatable button is comprised in the icon representative of the respective camera in the subset at the camera map position of the respective camera.

The processing unit in the second aspect may be preferably configured to: receive Geographic Information System (GIS) data associated with the position of the selected camera; and determine an adjusted FOV associated with the video stream of the selected camera, the determination being based on the FOV data and on the GIS data, where the adjusted FOV indicates unobscured FOV and/or limited-visibility FOV, wherein the FOV of the selected camera utilized in the displaying of the geo-map is the adjusted FOV.

The processing unit may be further configured to determine the direction of movement of the selected camera at the associated time. The processing unit may be further configured to determine a projected FOV area, the projected FOV is an estimate of an area covered by the FOV of the selected camera at a later time, where the projected FOV area is based on the direction of movement of the selected camera. The UI client may be further configured to display, on the geo-map, a geographical area that additionally comprises at least the extent of the projected FOV area of the selected camera.

Thus, the geo-map additionally shows at least the extent of an area ahead of the FOV in the direction of movement of the camera, i.e. a part of the geographical area that the camera view is moving towards, and possibly into unless a change of direction is made. If the camera is moving straight forward, the projected FOV area will be further in front of the camera, whereas if the camera is turning, and its movement is sideways, the projected FOV area will be to the side of the FOV towards which the camera is turning. The direction of movement of the selected camera may be determined from the FOV data, e.g. from the position of the camera at different times.

The projected FOV may be further based on the adjusted FOV. That is to say, the projected FOV may take into account the adjusted FOV for that camera.

A graphical representation of the projected FOV area may be provided. That is to say that a graphical representation of the projected FOV may be provided on the geo-map. The process of updating may also be performed based on the projected FOV.

A graphical representation of at least the part of the projected FOV area, which is not part of the graphical representation of the FOV of the selected camera, may be provided.

Thus, the geo-map may display a graphical representation, such as an outline, of the entire projected FOV area, or it may show a graphical representation only the projected FOV area that does not overlap with a graphical representation of the FOV.

The geo-map may be centred in the combined area covered by the FOV of the selected camera and the projected FOV area.

In another aspect there is disclosed a computer-implemented video management method for a video management system (VMS), comprising steps: receive, at a video management system, a plurality of video streams and associated metadata streams, each video stream being supplied by, or associated with, respective ones of a plurality of video cameras, receive field-of-view (FOV) data associated with the plurality of video streams, the FOV data comprising: position and orientation of each camera, and image sensor and lens information of each camera, determine the FOV of the selected camera at a time associated with the displayed video frame, provide a graphical user interface (GUI) and display, to a user via the GUI, the video stream of a selected camera frame-by-frame, display, via the GUI, a geo-map, display, on the geo-map, an icon representative of the selected camera at a camera map position, update the geo-map continuously according to the FOV of the selected camera such that the geo-map comprises at least the extent of the FOV of the selected camera.

The computer-implemented video management method may further comprise steps of: display, on the geo-map, a graphical representation of the FOV of the selected camera.

The computer-implemented video management method may further comprise steps of: determine a subset of the plurality of video cameras for which the position of the video camera is within the geographical area displayed in the geo-map and/or for which the FOV of the video camera is at least partially within the geographical area displayed in the geo-map; display an icon on the geo-map representative of each camera in the subset at a respective camera map position.

The computer-implemented video management method may further comprise steps of: display, on the geo-map, a graphical representation of the FOV within the geo-map of each of the cameras in the subset of the plurality of video cameras.

The computer-implemented video management method may further comprise steps of: display, on the geo-map, a user-activatable button associated with each of the cameras in the subset of the plurality of video cameras, where activating a button selects the associated camera in the subset, and wherein, optionally, the user-activatable button is comprised in the icon representative of the respective camera in the subset at the camera map position of the respective camera.

The computer-implemented video management method may further comprise steps of: determine the direction of movement of the selected camera at the associated time, determine a projected FOV area, which is an estimate of the FOV of the selected camera at a later time, where the projected FOV area is based on the direction of movement of the selected camera, display, on the geo-map, a geographical area that additionally comprises at least the extent of the projected FOV area of the selected camera.

The computer-implemented video management method may further comprise steps of: display, one the geo-map, a graphical representation of the projected FOV area, or display, on the geo-map, a graphical representation of at least the part of the projected FOV area, which is not part of the graphical representation of the FOV of the selected camera.

The computer-implemented video management method may further comprise steps of: receive GIS data associated with the position of the selected camera; determine an adjusted FOV associated with the video stream of the selected camera, the determination being based on the FOV data and on the GIS data, where the adjusted FOV indicates unobscured FOV and/or limited-visibility FOV, and wherein the FOV of the selected camera utilized in the displaying of the geo-map is the adjusted FOV.

In another aspect there is disclosed a video management system (VMS) comprising a processing unit comprising microprocessor executable program instructions configured to carry out one or more of the method steps disclosed herein.

In the aspects disclosed herein, terms and features relate to the terms and features having the same name in the other aspects and therefore the descriptions and explanations of terms and features given in one aspect apply, with appropriate changes, to the other aspects. Additional aspects, embodiments, features and advantages will be made apparent from the following detailed description of embodiments and with reference to the accompanying drawings. Features or elements of one aspect may be combined with features or elements of other aspects.

BRIEF DESCRIPTION OF THE DRAWINGS

The above aspects will be apparent and elucidated from the embodiments described in the following with reference to the drawings in which:

FIGS. 3A, 3B and 3C illustrate a camera recording video in an environment, where the FOV of the camera is being partially obstructed by structures in the environment;

DETAILED DESCRIPTION

Figure 1:
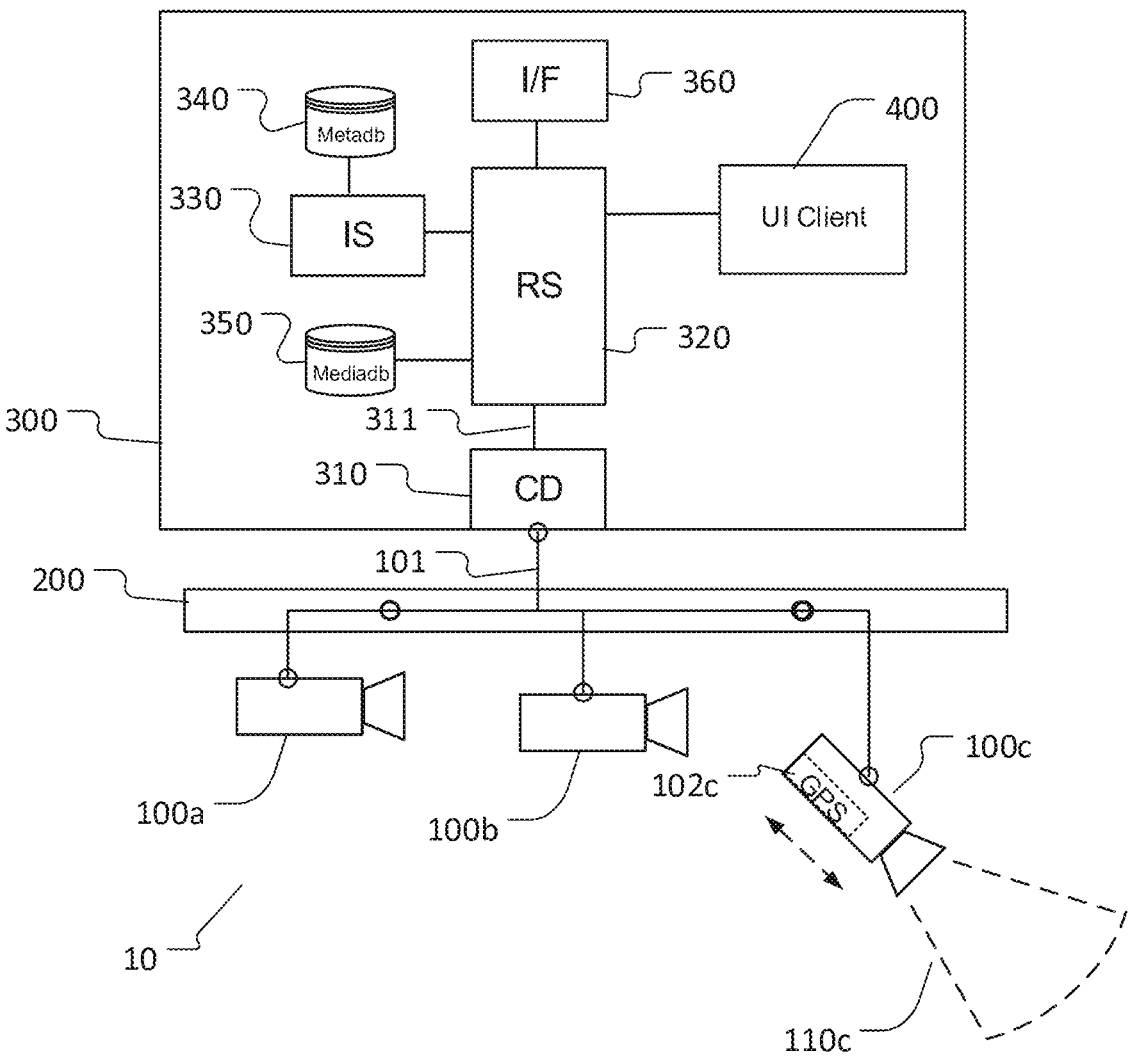
FIG. 1 is a schematic block diagram of an exemplary video surveillance system according to some embodiments.

FIG. 1 is a schematic block diagram of an exemplary video surveillance system 10. The video surveillance system 10 comprises a plurality of video cameras 100a, 100b, 100c communicatively connected to a video management system (VMS) 300 via respective wired or wireless communication links or connections 200.

Some embodiments of the video surveillance system 10 may comprise a mix of movable video cameras and stationary video cameras for example at least one movable video camera 100c and one or more stationary video cameras 100a, 100b. Other embodiments may exclusively comprise one or more movable video camera(s) and no stationary video cameras while yet other embodiments exclusively comprise stationary video cameras. The stationary video cameras 100a, 100b are, when present, typically distributed across a predetermined area or space where surveillance is desired. The number and position/location of the stationary video cameras 100a, 100b of the video surveillance system 10 as well as the type of video camera comprised therein may be selected based on factors such as a level of surveillance desired, a size of the surveillance area or facility and/or the complexity of the layout of the surveillance area or facility. The movable video camera(s) 100c has a Field of view (FOV) and the stationary video cameras 100a, 100b have respective FOVs (not shown). The FOV is the open, observable area of the camera in question as schematically illustrated by a pie-shaped outline 110c. The skilled person will appreciate that different types of video cameras may have different FOVs for example caused by different optical properties of camera lenses.

In the present specification, the term "movable" as a property of a video camera means the camera can be moved, i.e. is geographically dynamic, while carrying out video recording and/or live video streaming. The video recording and/or live video streaming is often carried out during active operation of the video surveillance system 10. The movable video camera is for example displaced along a certain path or trail of the surveillance area. A stationary video camera is typically fixed to a stationary object, like a building wall or a pole in the surveillance area.

The movable video camera 100c may travel along a path or trail of the surveillance area via mounting to any suitable support structure of various types of vehicles for example motorized vehicles like cars, trucks, busses, trains, motorcycles etc. The movable video camera 100c may be moved along the path or trail of the surveillance area by being mounted on, or worn by, a person via a suitable support like a belt etc. The person may for example be a police officer, bus driver, firefighter etc. In the latter situation, the movable video camera 100c travels through the surveillance area when the person walks or runs. Alternatively, the movable video camera 100c may be transported or moved via the vehicle's travel when the person wearing the movable video camera 100c is a driver or passenger of the vehicle. The stationary video cameras 100a, 100b may be mounted on, or fixed to, various kinds of stationary structures like factory or office buildings, train stations, support structures arranged at traffic roads or junctions etc.

The movable video camera(s) may be conventional portable video camera(s) known as such in the art of video surveillance. It will be appreciated that the video surveillance system 10 typically includes a plurality of movable video cameras of the same type and/or different types. Different types of movable video cameras of the video surveillance system 10 may for example be tailored to specific operation schemes and placements, e.g. fixed to a truck or on-person fixations. The movable video cameras of different types may be configured to supply video streams of different resolution, in different formats or outputting additional metadata associated with the video stream. Examples of functions of the movable video cameras may include one or more of the following: video streaming, in particular live streaming, and/or video recording and audio streaming and/or audio recording. The video streaming and/or video recording may be carried out in visible wavelength ranges and/or in infrared wavelength ranges, such as near-infrared wavelength ranges. The moveable video camera(s) and stationary video cameras may comprise various control functions such as pan or zoom, image processing capabilities, motion detection, etc.

The respective video streams supplied by the stationary video cameras 100a, 100b as well as those of the one or more movable video cameras 100c are associated respective metadata streams. The metadata stream may be separate stream from the associated video stream but originating from either the same video camera or another device mounted on the same person or vehicle as the video camera. The metadata stream associated with each video stream preferably includes time stamps together with corresponding position data associated with the video camera in question. This property allows time synchronization of the video streams and metadata streams at the VMS. The respective geolocations of the stationary video cameras 100a, 100b and those of the one or more movable video cameras 100c may be derived from the position data supplied by a camera associated GPS unit or device. The associated GPS unit or device of a movable or stationary video camera may be built into the video camera as schematically illustrated by GPS device 102c of the movable video camera 100c, or may be fixed to a vehicle or person carrying the movable video camera in question.

The stationary video cameras 100a, 100b as well as the one or more movable video cameras 100c are often communicatively connected to the video management system (VMS) 300 as mentioned above for example connected via a local area network 200 or in any other suitable manner, e.g. via point-to-point wired and/or wireless connections, or the like. For example, the stationary video cameras 100a, 100b may be connected to the VMS via an Ethernet connection. The one or more movable video cameras 100c may often be wirelessly connected to the VMS 300 for example through a wireless network like Wi-Fi, a 4G and/or 5G network. However, one or more movable video cameras 100c may alternatively be configured to record the video stream during active operation where the video camera moves in or through the surveillance area. In the latter scenario, the recorded video stream may be transferred to, or off-loaded at, a media repository 350 of the VMS 300 at the time of return to an associated station. In the latter use case, the video stream may be offloaded at regular time intervals for example when a camera user or cameral vehicle such as a bus driver or police officer returns to the station.

The skilled person will understand that some exemplary video surveillance systems may include additional sensors providing sensor signals and/or media streams different from video streams, such as audio signals, radar signals, Lidar signals, etc.

The VMS 300 is preferably configured to store the received video streams in the media repository 350. The VMS 300 provides an interface 360 for accessing live video streams as well as the previously discussed added metadata, and to access video streams with respective metadata stored in the media repository 350. The interface 360 may implement different types of interfaces. For example, the interface may provide an application interface, e.g. in the form of a software development kit and/or one or more communication protocols, such as a suitable messaging protocol, e.g. SOAP, XML, etc. Accordingly, the interface may operate as a gateway to different types of systems. The VMS may be configured to implement various types of processing of received live video streams and/or recorded and retrieved video streams for example object detection, object recognition, motion detection etc.

The media repository 350 may comprise a media database or other suitable storage device for storing media content. The VMS may include a user interface client (UI client) 400, for example configured to provide a graphical user interface, displayed on a suitable user screen or screens of the VMS 300. The graphical user interface enables users to view live video streams and/or stored video streams and/or to control operation of one or more of the stationary video cameras 100a, 100b and/or control operation of the one or more movable video cameras 100c. The content and structure of data items displayed through the user interface may be configurable by the operator via control buttons etc. The user interface comprises a map component integrated in VMS. The map component is utilized to build or provide a geo-map of at least a part of the surveillance area for presentation on the user screen. The map component may be configured to provide a geo-map overview of the respective positions of the plurality of video cameras.

The VMS 300 may be embodied as one or more software program(s) comprising respective computer executable instructions configured for execution on a suitable data processing system, e.g. by one or more server computers. The data processing system implementing the VMS is typically arranged remote from the one or more movable video cameras 100c as the latter often travel over a large geographical area for example through a route or trail comprising various streets, roads and facilities. The route or trail may cover a city neighbourhood or even an entire city. The video streams from the movable video camera(s) may be transmitted to the VMS 300 over wireless public or other wireless communications networks. Alternatively, the movable video camera(s) 100c of the video surveillance system 10 may move in relative proximity to a locally arranged on-site VMS 300 for example in a manufacturing facility, residential or office buildings, shopping centre etc.

The VMS 300 may comprise one or more camera drivers 310 for providing interfaces to respective types of stationary and movable video cameras. Different types of these video cameras may provide their respective video streams in different formats, e.g. using different encoding schemes and/or different network protocols. Similarly, different cameras may provide different interfaces for camera control such as zoom, or pan. Accordingly, the VMS 300 may include a plurality of different camera drivers 310 configured to cooperate with respective camera types. In particular, the camera drivers 310 may implement one or more suitable network protocols and/or other communications standards for transmitting data between movable and stationary video cameras and/or other peripheral devices and data processing systems. Examples of such protocols and standards include the Open Network Video Interface Forum (ONVIF) standard and the Real Time Streaming Protocol (RTSP).

The camera drivers 310 may further configured to add one time stamp to each frame of the received video streams 101 so as to ensure that the video streams, which are stored and subsequently supplied by the VMS 300, include a uniform time stamp. The added time stamp will also be referred to as a canonical time stamp. The canonical time stamp is indicative of the time of receipt, by the VMS 300, of the respective video streams from the respective stationary and movable video cameras. The camera drivers thus provide uniformly time-stamped input video streams 311, each time-stamped input video stream 311 corresponding to a respective one of the received video streams.

The VMS 300 comprises a recording server 320. The recording server may be embodied as a software program module executed by a suitable data processing system, e.g. by one or more server computers. The recording server receives the inputted video streams 311 originating from the respective stationary and movable video cameras through the corresponding camera drivers 310. The recording server stores the received inputted video streams in a suitable media storage device, such as a suitable media database. It will be appreciated that the media repository 350 may be part of the VMS 300 or it may be separate from, but communicatively coupled to the VMS. The media repository 350 may be implemented as any suitable mass storage device, such as one or more hard disks or the like. The storing of the received input video streams is also referred to as recording the received input video streams. The recording server may receive additional data such as the previously discussed metadata stream.

The VMS 300 may store the generated metadata in a suitable metadata repository 340, such as a suitable metadata database, which may be separate from or integrated into the media repository 350. To this end, the VMS 300 may include an index server 330. The index server may be embodied as a software program module executed by a suitable data processing system, e.g. by one or more server computers. The index server may receive metadata and store the received metadata in the metadata repository 340. The index server may further index the stored metadata so as to allow faster subsequent search and retrieval of stored metadata.

Figure 2A:
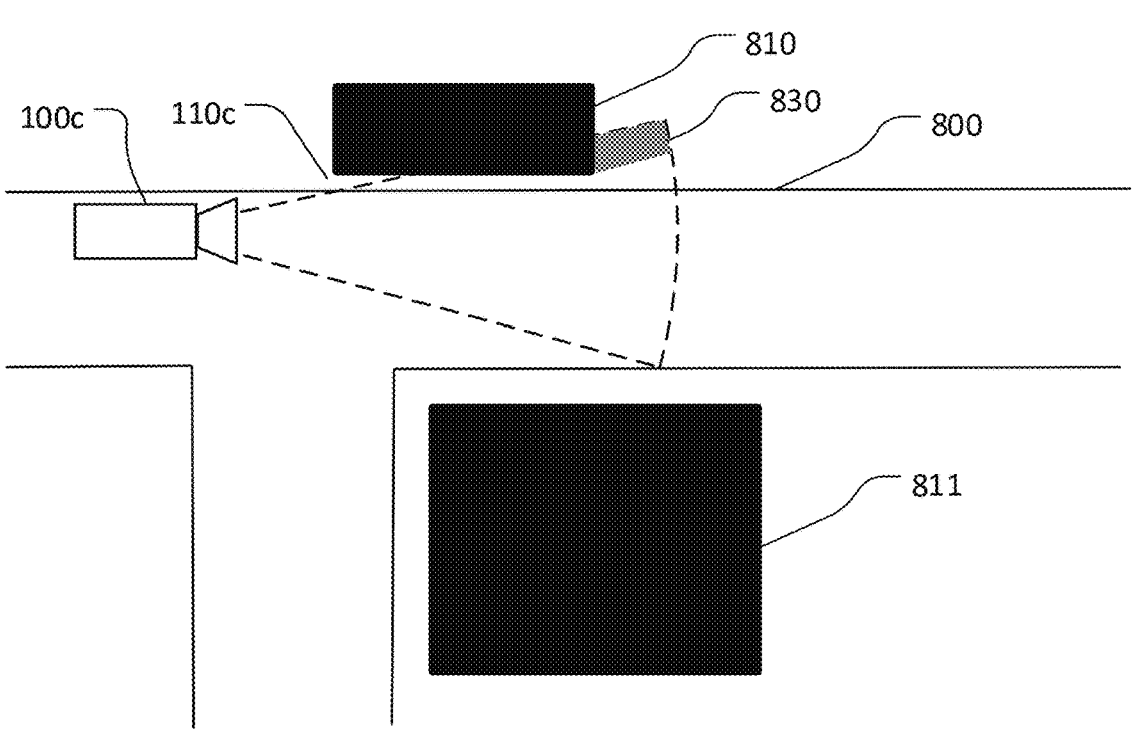
FIGS. 2A and 2B illustrate a moving camera recording video in an environment, wherein the FOV of the camera is being partially obstructed by structures in the environment.
Figure 2B:
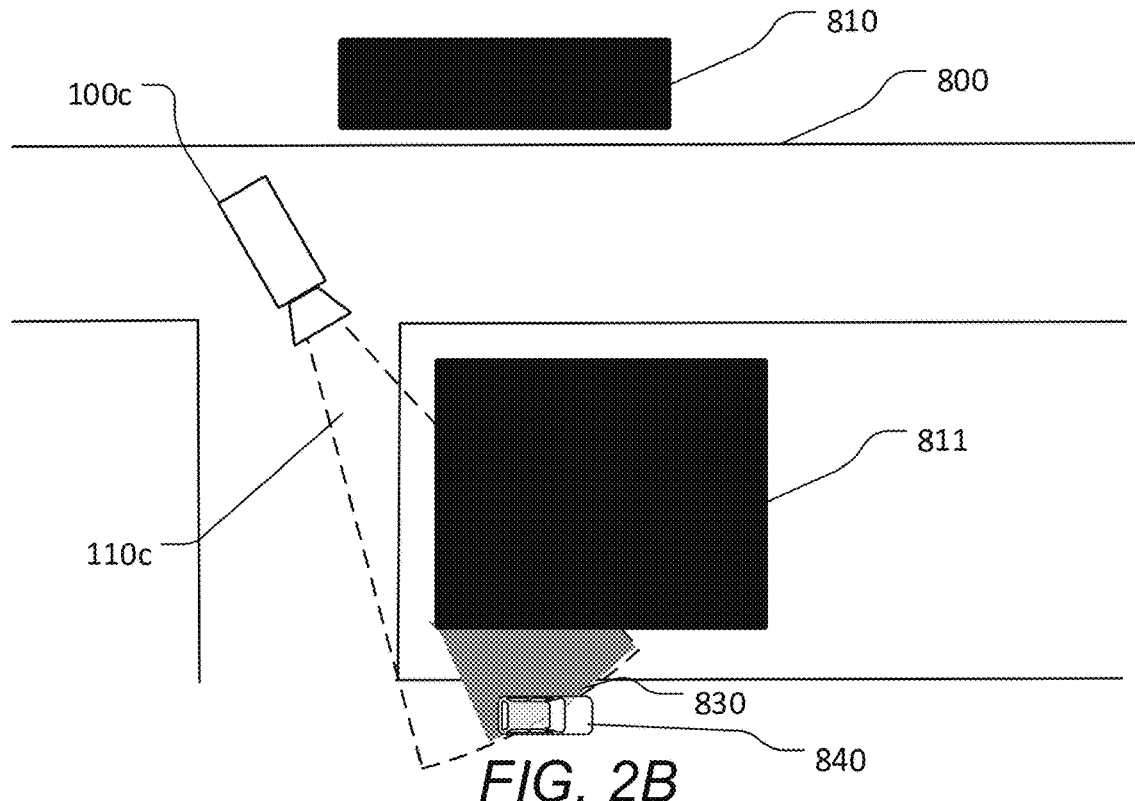

FIGS. 2A and 2B illustrate a moving camera 100c recording video in an environment, wherein the FOV 110c of the camera is being partially obstructed by structures 810, 811 in the environment.

The camera 100c may be e.g. a camera mounted in or on a vehicle or it may be worn or carried by e.g. a person. The camera 100c is moving along on a road structure 800 with buildings 810,811 interspersed beside the roads.

In FIG. 2A the FOV 110c of the camera is obstructed by a building 810 creating an obscured area 830 of FOV, where the camera is unable to observe.

FOV data, for example FOV data supplied by the camera, and possibly other devices associated with the camera, such as e.g. a GPS device, may be used to calculate the area covered by the FOV 110c of the camera. Additionally, FOV data may be obtained from other sources. FOV data used in such calculations are position and orientation of the camera, and image sensor and lens information of the camera. Combining this FOV data with relevant data from a Geographic Information System (GIS), an adjusted FOV may be calculated in which wholly or partially obstructing structures, such as buildings 810, are accounted for.

In FIG. 2B, the camera 100c is turned on the road 800 and the FOV 110c of the camera is now being obscured by a second building 811. With an unobstructed view, the camera would now be able to see the target object 840, a car. However, the second building 811 is interrupting the line-of-sight of the video camera 100c and hiding the car 840.

Figure 3A:
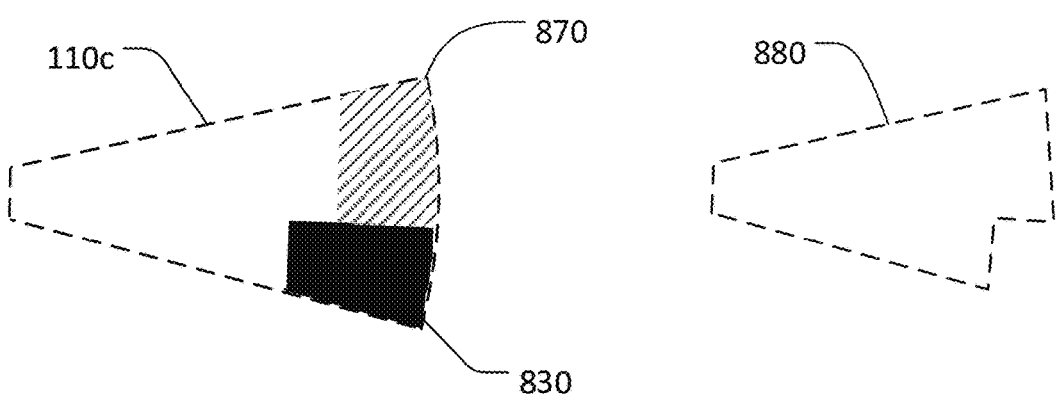

FIG. 3A illustrates a camera 100c recording video in an environment, where the FOV 110c of the camera is being partially obstructed by structures 850, 860 in the environment.

The camera 100c is pointing towards a target object 840, a car, which would be clearly visible to the camera were it not for the fully obscuring object 860 and the partially obscuring object 850. The fully obscuring object 860 completely blocks line-of-sight for the camera. Thus, the area of the FOV wherein the fully obscuring object 860 is as well as the "shadow" cast in the FOV 110c by the fully obscuring object 860, is obscured and the camera is not able to see this area.

Similarly, a partially obscuring object 850 partially blocks line-of-sight for the camera. Thus, the area of the FOV wherein the partially obscuring object 850 is as well as the "shadow" cast in the FOV 110c by the partially obscuring object 850, is an area of limited visibility for the camera.

FIGS. 3B and 3C illustrate the concepts of the FOV 110c and an adjusted FOV 880 of a camera. FIG. 3B shows an outline of the FOV 110c of a camera (not shown) with areas within the FOV, which are either obscured 830 or of limited visibility 870.

FIG. 3C shows an adjusted FOV 880, wherein both the obscured 830 or of limited visibility 870 areas of the FOV

110c have been removed leaving only the areas unobstructed by any structures described in the GIS data used in the determination of the adjusted FOV 880. In other embodiments, the adjusted FOV 880 may comprise the limited visibility area 870, possibly indicating the area of limited visibility.

Figure 4:
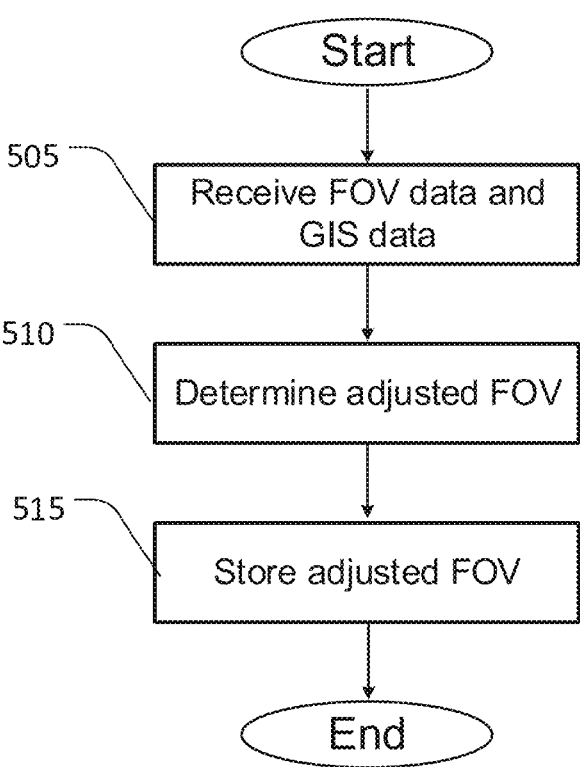
FIG. 4 shows a flow diagram of a computer-implemented video management method according to some embodiments.

FIG. 4 shows a flow diagram of a computer-implemented video management method according to some embodiments.

In step 505, a video management system receives a plurality of metadata streams, possibly bound to timestamps, and associated with a plurality of video streams, respectively. Each video stream is supplied by, or associated with, respective ones of a plurality of video cameras and each of the metadata streams may comprise FOV data. Additionally, FOV data may be obtained from other sources. The FOV data comprises at least one of: position and orientation of each camera, and image sensor and lens information of each camera.

Further, the video management system receives, or retrieves from a local repository, GIS data associated with the position of each camera.

In step 510, a processing unit comprised in the video management system determines an adjusted FOV associated with each video stream, the determination being based on the FOV data and on the GIS data, where the adjusted FOV indicates unobscured FOV and/or limited-visibility FOV.

In optional step 515, the adjusted FOV is stored, for example in a local repository.

Figure 5A:
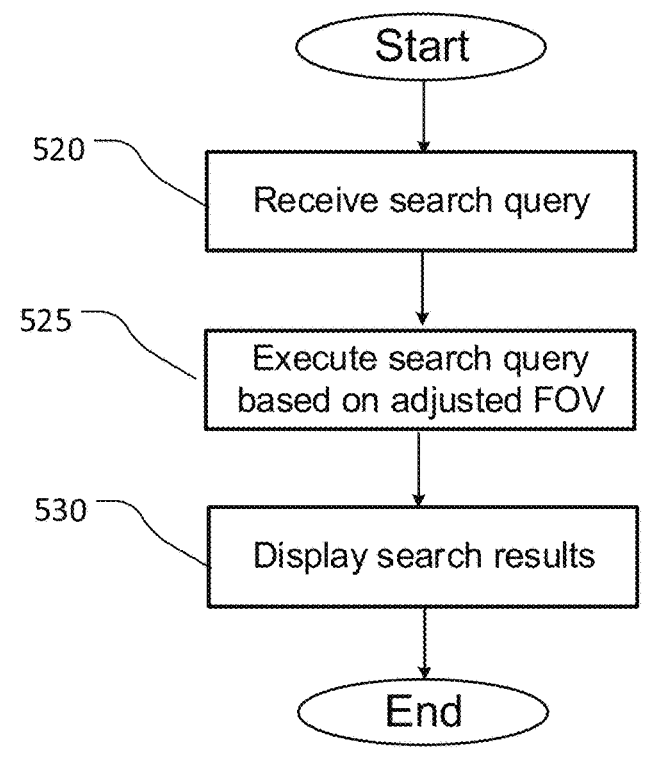
FIGS. 5A and 5B show flow diagrams of a computer-implemented video management method according to some embodiments.
Figure 5B:
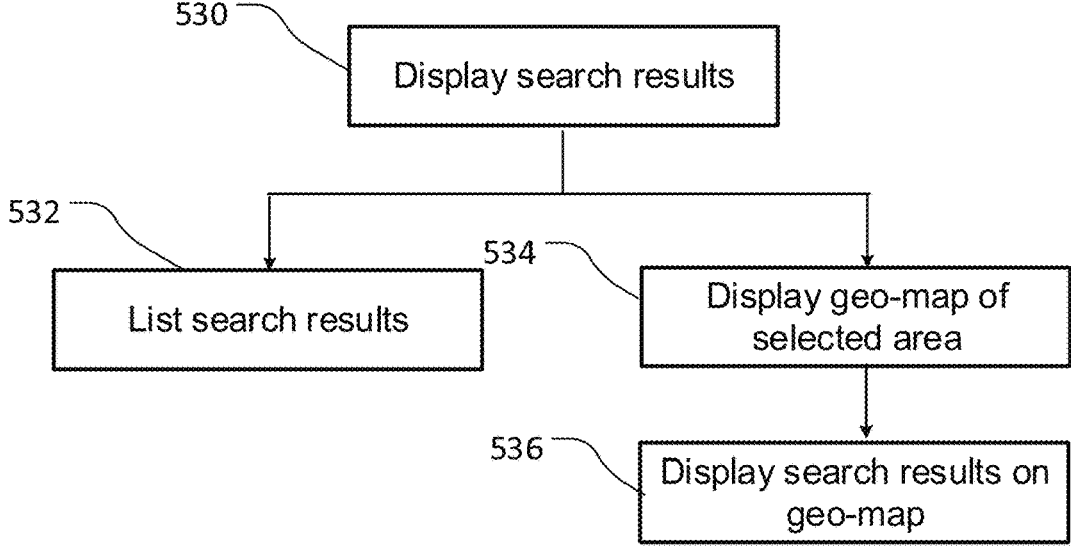

FIGS. 5A and 5B show flow diagrams of a computer-implemented video management method according to some embodiments.

In step 520, a VMS receives a search query, for example via a User Interface (UI) client comprised in the VMS. The search query comprises a target location or target area.

In step 525, a processing unit comprised in the VMS performs a search in the data repository comprising determined adjusted FOV and identifies a subset of the plurality of video streams for which the adjusted FOV comprises the target location or target area.

Additional optional steps may comprise receiving a target time or a target time interval as part of the search query, and performing the additional limitation that the target location or target area is comprised within the adjusted FOV at the target time or within the target time interval.

In step 530, a user interface (UI) client comprised in the VMS and configured to provide a graphical user interface (GUI) provides GUI instructions for the display of the search results, see also description of FIG. 5B.

In FIG. 5B a flow diagram of the display of search results is shown.

In step 530, a user interface (UI) client comprised in the VMS and configured to provide a graphical user interface (GUI) provides GUI instructions for the display of the search results. The search results, which are a subset of the plurality of video streams, may be conveyed to a user via the GUI as the respective camera from which the video stream originated.

The search results may be provided via the GUI as a listing and/or as a visual display by overlaying the search results on a geographical map.

In step 532, the search results are listed in some form, for example as text strings or as icons, each identifying a camera from the search results.

In step 534, which may be performed instead of or together with step 532, a geo-map of a selected area comprising the target position or target area is displayed in the GUI.

Figure 7A:
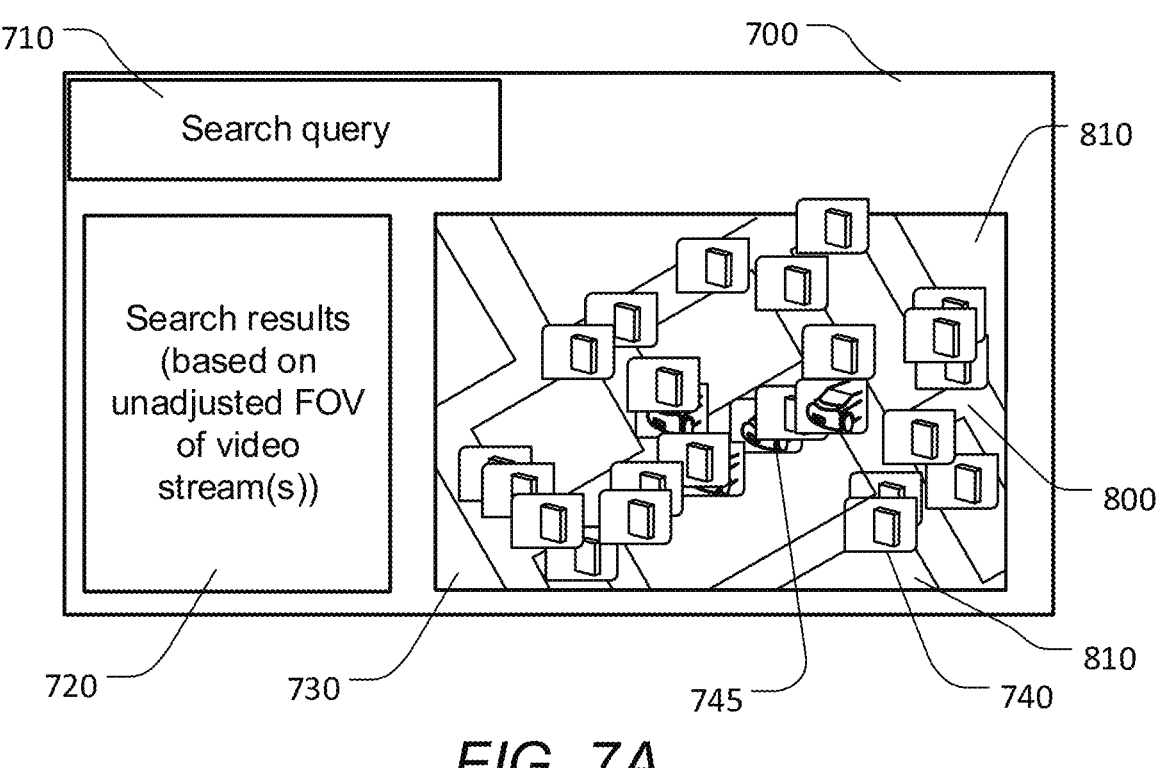
FIGS. 7A and 7B illustrate in schematic form an exemplary graphical user interface of a VMS according to some embodiments.
Figure 7B:
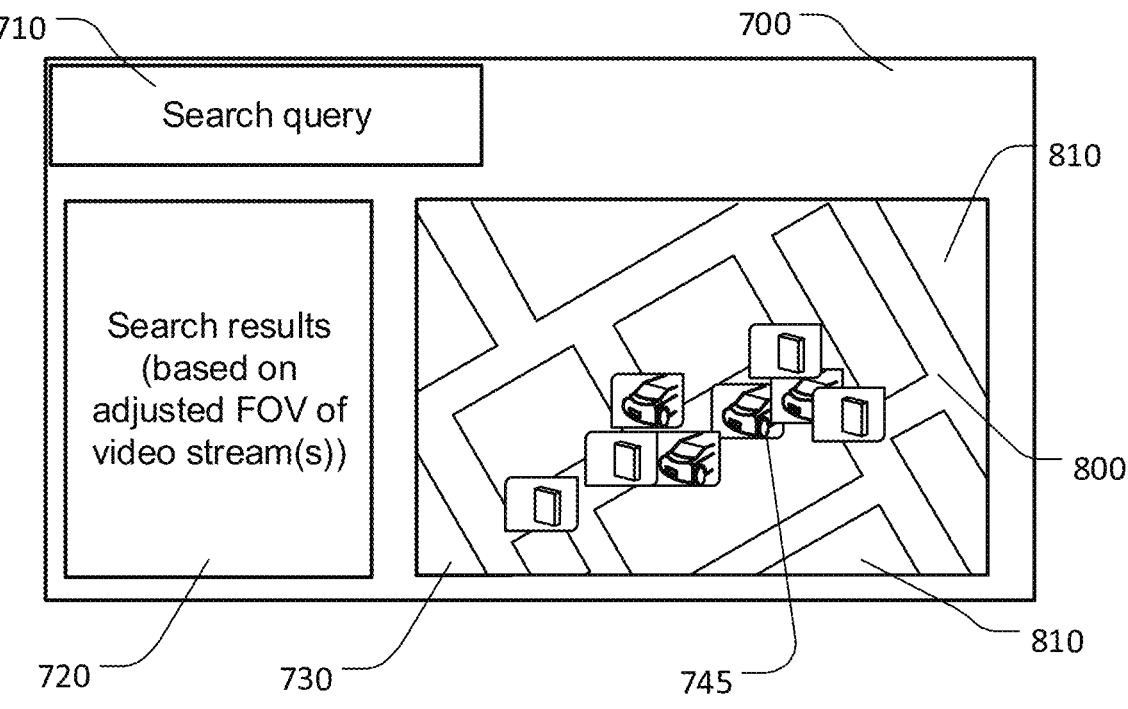
Figure 8:
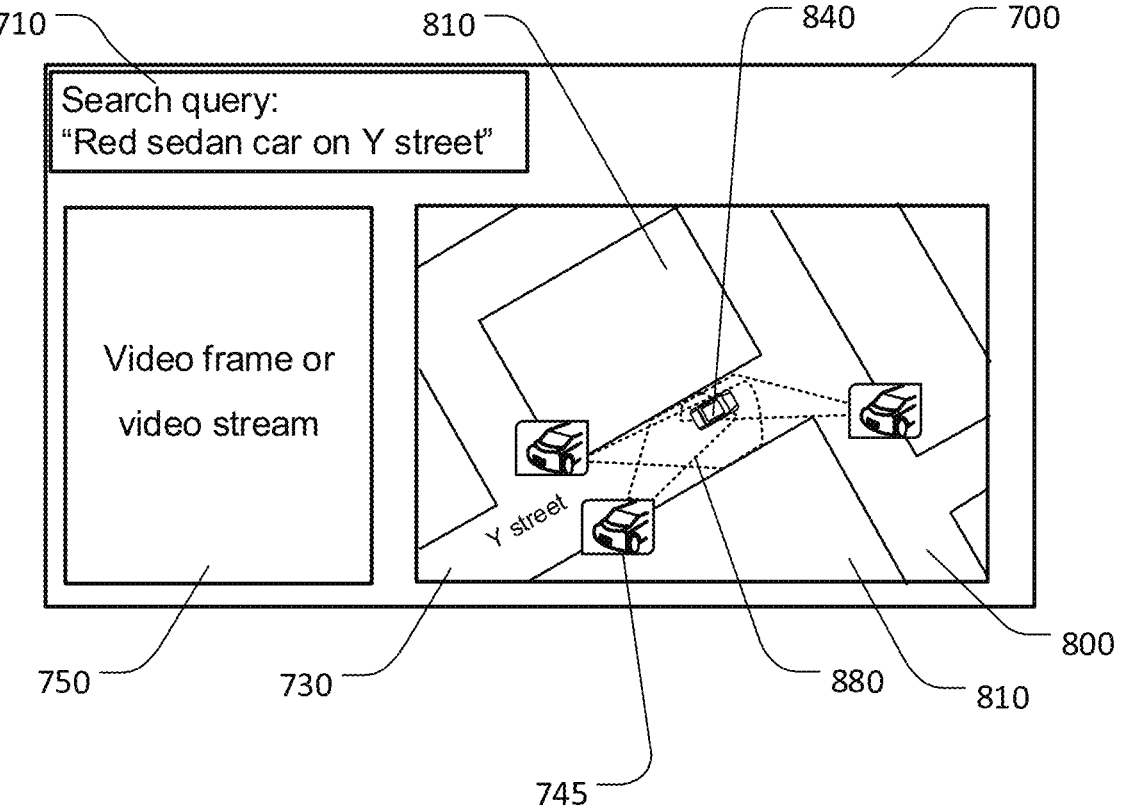
FIG. 8 illustrates in schematic form an exemplary graphical user interface of a VMS according to some embodiments.

In step 536, the search results of the identified subset of the plurality of video streams are displayed on the geo-map, see also FIGS. 7A, 7B, and 8. The respective cameras in the search results are displayed on the geo-map as an icon or thumbnail and at a position on the geo-map that is representative of the camera position, where the video stream that lead to the search result was recorded.

Additionally, the adjusted FOV of each camera in the subset at a timestamp associated with the search result may be displayed in the geo-map, see also FIG. 8.

Figure 6A:
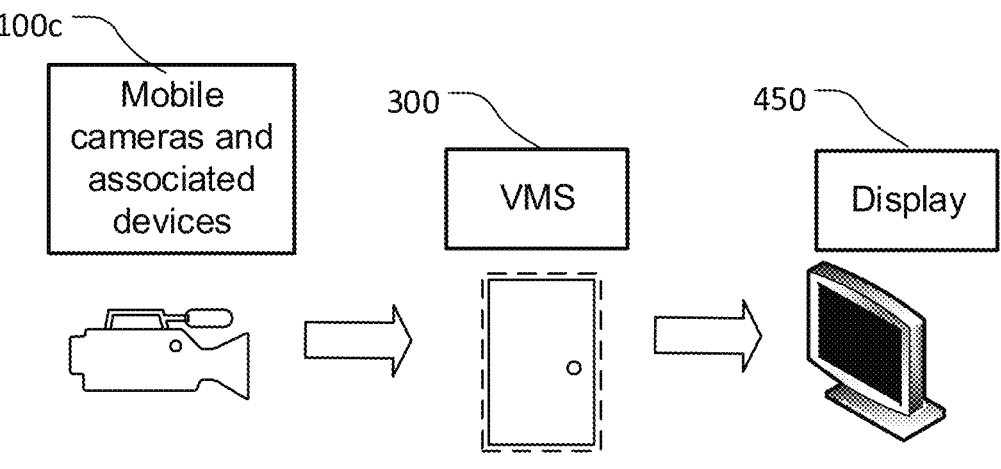
FIGS. 6A and 6B show a swim lane diagrams of a computer-implemented video management method according to some embodiments.
Figure 6B:
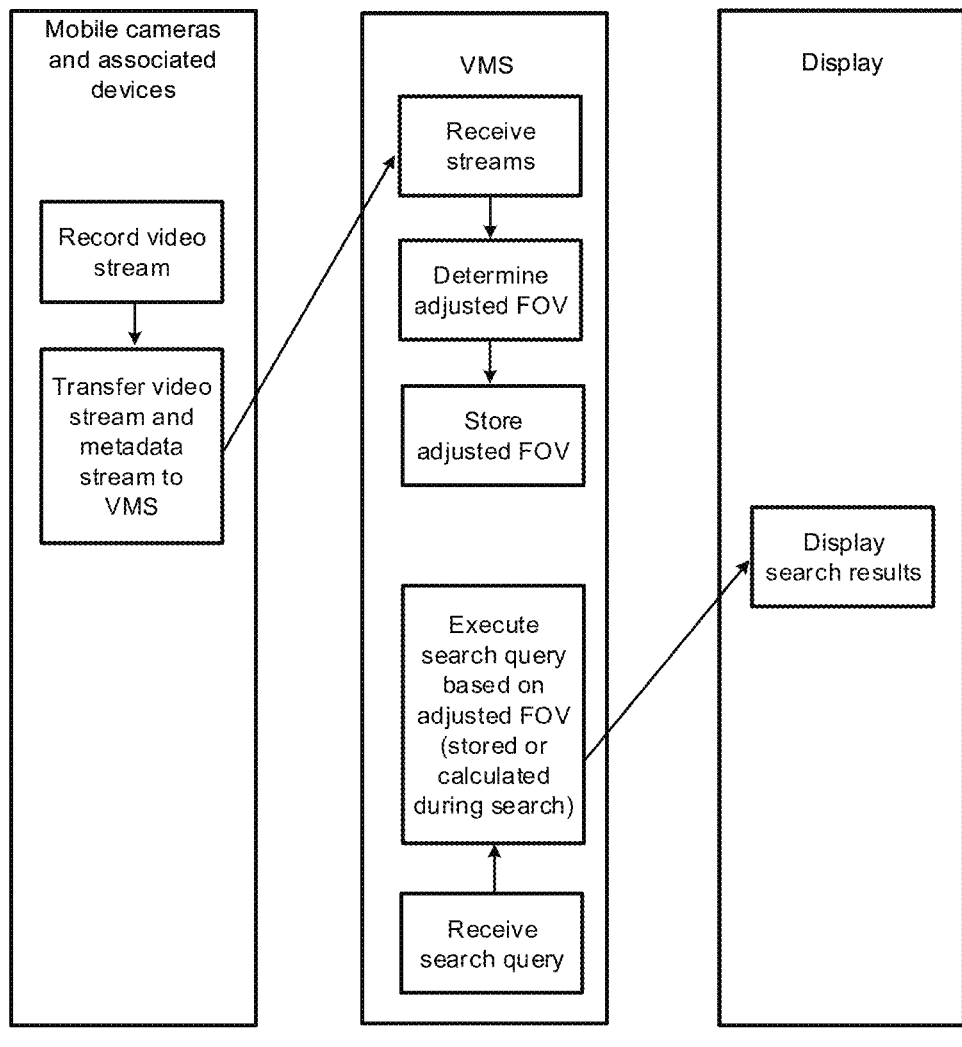

FIGS. 6A and 6B show swim lane diagrams of a computer-implemented video management method according to some embodiments. The diagrams illustrate the sharing of data to and from the VMS.

In FIG. 6A is illustrated how a plurality of movable cameras 100c and associated devices, e.g. a GPS device, generate respective video streams and metadata streams, possibly bound to timestamps. The video streams and metadata streams are provided to a VMS 300 as disclosed herein. Each camera of the plurality of video cameras comprise, or is associated with, a position detecting device and an orientation detecting device configured to add position metadata and orientation metadata, respectively, to each of the respective video streams.

The VMS 300 comprises a User Interface (UI) client, which provides the necessary instructions for display of a Graphical User Interface (GUI) on a display 450 receiving data from the UI client.

The VMS 300 may act as a subsystem within a video surveillance system.

In FIG. 6B is illustrated in detail how the VMS 300 receives and shares data. Each column shown corresponds to the elements shown and described in connection with FIG. 6A.

A plurality of movable cameras 100c record video streams. Together with metadata streams generated by components within each movable camera 100c or by one or more associated devices, the video streams are transferred to the VMS 300.

The VMS receives the video and metadata streams and determines an adjusted FOV, where the determination of the adjusted FOV is done separately from or in connection with a search. The VMS may receive a search query and perform a search based on the adjusted FOV.

The result of the search may be displayed in a GUI on a display 450 connected to the VMS 300, see also FIGS. 7A, 7B, and 8.

FIGS. 7A and 7B illustrate in schematic form an exemplary graphical user interface (GUI) 700 of a VMS according to some embodiments.

The GUI comprises a number of frames 710, 720, 730, wherein information is presented to a user.

A search query frame 710 allows a user to provide a search string, the content of which is transmitted to a VMS via a User Interface (UI) client in a suitable form. The one or more search results provided by the VMS in response to the search query are transmitted in a suitable form to the display on which the GUI is presented. The search result(s) may be conveyed to a user as a list of cameras from each of which a video stream provided a search result. In the GUI 700 the list of cameras may then be provided in a GUI frame 720 for that purpose.

Additionally, the GUI presents the user with a frame showing a geo-map 730. In addition to, or instead of, presenting the user with a list of cameras the search results may be illustrated to a user in the geo-map 730. For example, an icon or a thumbnail 740, 745 may be shown in a position on the geo-map that is representative of the camera position at a timestamp, when the respective video stream that provided the search result was recorded. A thumbnail comprises a frame of a video stream, which may further facilitate a user's comprehension and/or interpretation of the search result. For example, if a user is searching a large number of video streams looking for a specific car in a geographical area, a frame from a video stream in the area may assist the user in the evaluation of the video streams. For illustration, video streams that may be of interest to the user are shown with a thumbnail of a car 745, while the video streams, which are not of interest to the user are shown with a thumbnail of an obstructed view 740.

The skilled person will appreciate that the direct display on the geo-map of the positions of video cameras, possibly as thumbnails, provide the user with a fast and intuitive overview of the area where the search was conducted. This display scheme improves the user's awareness and decision-making as to possible other areas should be investigated in relation to the search results thus reducing the cognitive load on the user.

In FIG. 7A is illustrated a result of a search in a plurality of video streams without the reduction in the searched set of video streams provided by taking the adjusted FOV into consideration. The outcome of the search is a multitude of search results shown as thumbnails 740, 745 in the geo-map 730. The user is searching for video recordings on a road 800 in the center of the geographic area shown in the geo-map 730. Without knowing which structures such as buildings 810 are obstructing the view of cameras in the area, the search provides a large number of search results. Many of the video streams in the search result will not be of interest to the user as the view is obstructed, as shown in the thumbnail of an obstructed view 740. The user will either have to go through the multitude of search results, which may be too numerous for a manual search to be feasible, or try to restrict the search result further which may have the unintended result that a video stream of interest is not provided as a result of the further restricted search. Another possibility, as an alternative or in addition, is that an automated search for a target within the video stream is performed using image recognition. However, the larger the set of video streams to be looked through or searched by an automated process are, the more time and resource-intensive it will be to perform an automated image recognition search.

Instead, both a manual and an automated search can be facilitated by a reduction in the set of video streams in which the manual or automated search is performed. In FIG. 7B is illustrated what may be a result of the same search as shown in FIG. 7A, but with the reduction in the searched set of video streams provided by taking the adjusted FOV into consideration. That is, instead of searching in a larger set of video streams, the search is done in a subset of the plurality of video streams and the result is fewer search results compared to the illustration in FIG. 7A. This lower number of search results facilitates both a manual and/or an automated search.

FIG. 8 illustrates in schematic form an exemplary graphical user interface of a VMS according to some embodiments. The GUI 700 shown in FIG. 8 is similar to that shown in FIGS. 7A and 7B except for the GUI frame 750 for displaying a video frame or video stream. Additionally, the geo-map 730 displays not only thumbnails 745, but also a graphical representation of the adjusted FOV 880 of each camera at a timestamp associated with the search result. The adjusted FOV 880 of each camera is shown in connection with the thumbnail 745 in a position on the geo-map 730 that is representative of the camera position at the timestamp.

The thumbnails or icons associated with each search result may be configured as or associated with one or more user-activatable buttons, where the activation of a button may provide the user with various functionalities in the GUI 700. For example, the activation of a button may select an associated camera and e.g. display a video frame or a video stream from the camera in the GUI frame 750 for that purpose. Alternatively, or additionally, the geo-map may be centred on the selected camera and/or the geo-map view may zoom to show the adjusted FOV of the selected camera in detail.

Figure 9:
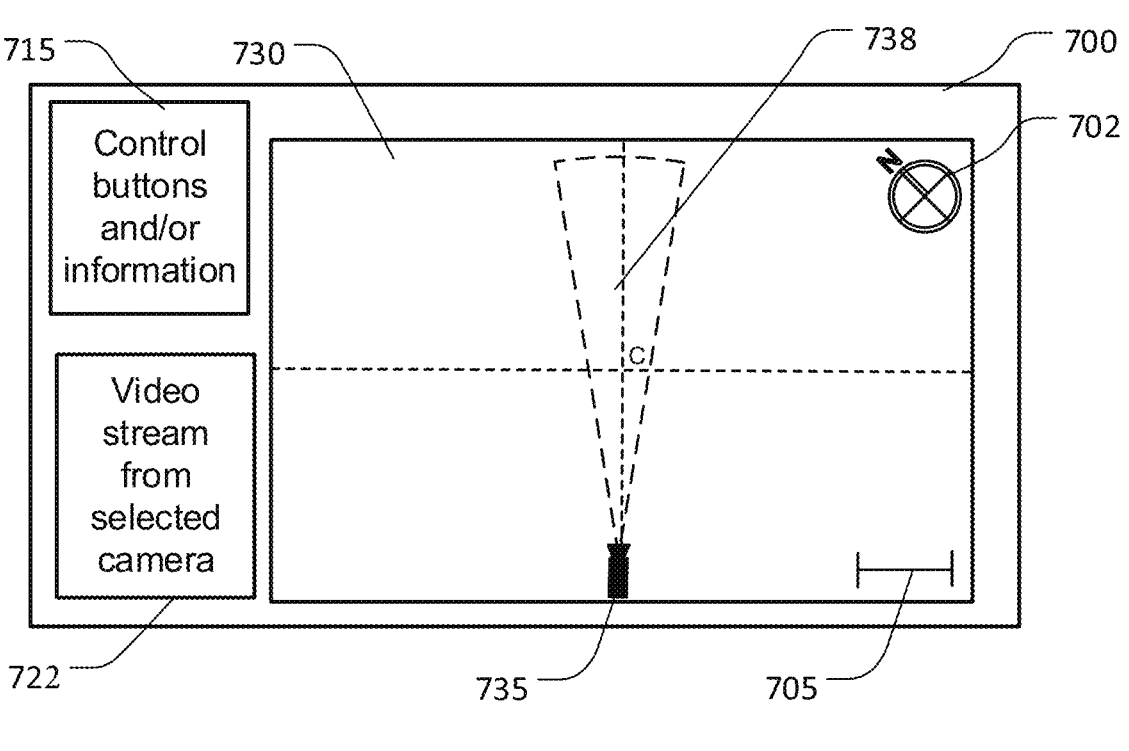
FIGS. 9-15, 16A and 16B illustrate in schematic form exemplary graphical user interfaces (GUIs) of a VMS according to some embodiments.

FIG. 9 illustrates in schematic form an exemplary graphical user interface (GUIs) of a VMS according to some embodiments.

The GUI 700 comprises a number of frames 715, 722, 730, wherein visual information is presented to a user.

A control and information frame 715 may provide the user with information, e.g. information relating to a video stream being displayed, or information relating to the geo-map shown in the geo-map frame 730. The control and information frame 715 may further provide the user with ways to communicate instructions to the VMS and/or other control systems. For example, the user may be provided with one or more buttons, sliders, text fields, etc., and/or with one or more input fields, wherein the user may input text, such as a search string. Inputted text may then be transmitted to the VMS via a User Interface (UI) client in a suitable form.

A video stream frame 722 is configured to show the video stream, for example the video stream from a selected camera may be shown in the frame. The video stream is shown frame-by-frame with each frame being associated with a time, for example by the frame having a timestamp. Such a timestamp may be shown in the control and information frame 715 together with controls for the user to select a different frame and/or a different timestamp.

Additionally, the GUI 700 presents the user with a geo-map frame 730 showing a map of a geographical area. Icons, graphics, and other information may be displayed in the geo-map as well, e.g. as overlays on the map. An icon representative of the selected camera is displayed on the geo-map at a camera map position, where the camera map position is a geographical position in the shown map. The camera map position may be the last known position of the camera, or the camera map position may be based on the reported position of the respective camera at a given time.

A processing unit within the VMS determines the FOV of the selected camera at a time associated with the displayed video frame, and the geo-map is continuously updated in accordance with the determined FOV such that the geo-map comprises at least the extent of the FOV of the selected camera.

Thus, advantageously, the GUI 700 may display a coordinated video stream and geo-map display, where a user watching a video stream, possibly paused at a single frame, can see the geographical area the camera was/is in at the time of recording the video. This provides the user with an increased awareness of the location seen in the video stream and may assist in the interpretation of what is seen in the video stream/frame.

The camera map position corresponds to a geographical position and is different from the relative position of the icon within the geo-map display. A number of options for the centring of the geo-map, and thereby of the positioning of the selected camera icon within the geo-map frame 730 as well as the bearing of the geo-map, are possible. In FIG. 9 the centre C of the geo-map is roughly at the centre of the FOV 738 of the selected camera, i.e. positioned at roughly half of the width at roughly half of the depth of the FOV of the selected camera.

When the area shown in the geo-map comprises the extent of the FOV, possibly with an additional area extent, the geo-map will dynamically zoom in and out on the geo-map as the FOV of the selected camera changes, e.g. as the zoom of the selected camera increases, the geo-map will zoom out, and as the zoom of the selected camera decreases, the geo-map will zoom in. A distance scale 705 shown in the geo-map frame provides scale for the shown map. A predetermined area extent may be selected by a user or may be a predefined setting. The GUI 700 may allow the user to select a degree of zoom of the geo-map, perhaps to see a larger geographical area or to see more detail in the map, while the video stream plays and the geo-map updates to illustrate the movement of the camera in the area.

A compass 702 on the map shows the bearing. The geo-map shown in FIGS. 9-12 is oriented such that the central line-of-sight of the camera is pointing up, which means that the bearing of the geo-map changes according to the orientation of the camera. Such a centering option may work well in a situation where the GUI is also showing the video stream in a frame at the same time as the geo-map is being shown, since this will provide a user with directions in the video and geo-map displays that are, to most user's, well connected visually, i.e. left and right in the video are the same as in the geo-map, while forward and backward in the video are up and down, respectively, in the geo-map.

Also shown in the geo-map frame 730 of the GUI 700 is a graphical representation of the FOV 738 of the selected camera. The FOV 738 is shown as a dashed outline, but may be illustrated for the user in other suited ways such as with a different type of outline, in colour, as a shading, etc. As the FOV of the selected camera changes, the graphical representation of the FOV 738 on the geo-map is updated to reflect the change providing the user with a direct display of the FOV on the geo-map. This gives a user a fast and intuitive overview of the area viewed by the selected camera to aid the user in understanding what is seen in the video stream, which reduces the cognitive load on the user.

Figure 10:
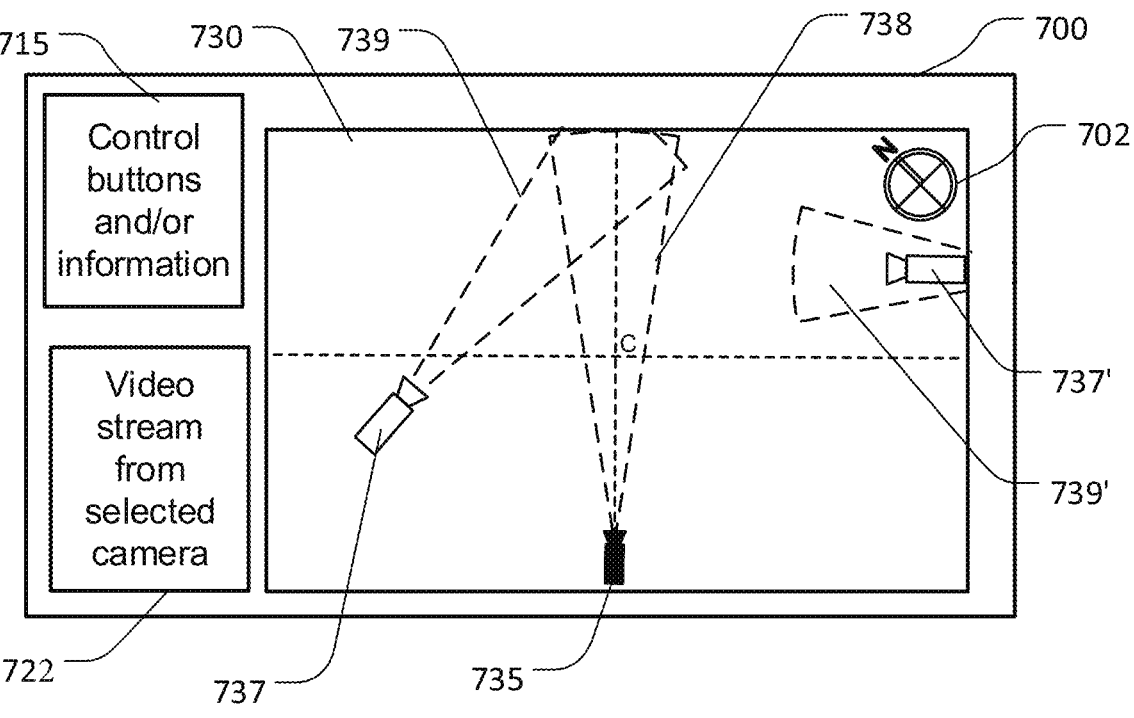

FIG. 10 illustrates in schematic form an exemplary graphical user interface (GUIs) of a VMS according to some embodiments. The GUI 700 in FIG. 10 is similar to the one shown in FIG. 9. Additionally, the GUI 700 in FIG. 10 shows a representative icon 737 of other known cameras, a second camera, positioned within the geographical area shown in the geo-map and a representative icon 737' of a third camera for which its FOV is at least partially within the geographical area shown in the geo-map. The icon representing the second camera 737 positioned within the geographical area is shown at the respective camera map position like that of the selected camera, while the icon representing the third camera 737', which is positioned outside of the area shown on the geo-map is positioned on the edge of the geo-map that is closest to what would be the camera map position of that camera.

Also shown in the geo-map frame 730 of the GUI 700 is a graphical representation of the FOV 739 of the second camera 737, and a graphical representation of the partially seen FOV 739' of the third camera 737'.

Thus, a user is able to quickly assess whether other cameras in the geographical area of the selected camera might have footage, which is of interest to the user. As the number of video cameras and available video footage is ever increasing, being able to find the right footage in the many available streams is of great value.

The icons representing the second 737 and third 737' camera shown in the geo-map may have activatable buttons, which allow a user to select another camera, i.e. to choose another camera, which is the selected camera. This allows the user to switch the view to another camera and view the video stream from that camera.

Figures 11, 12:
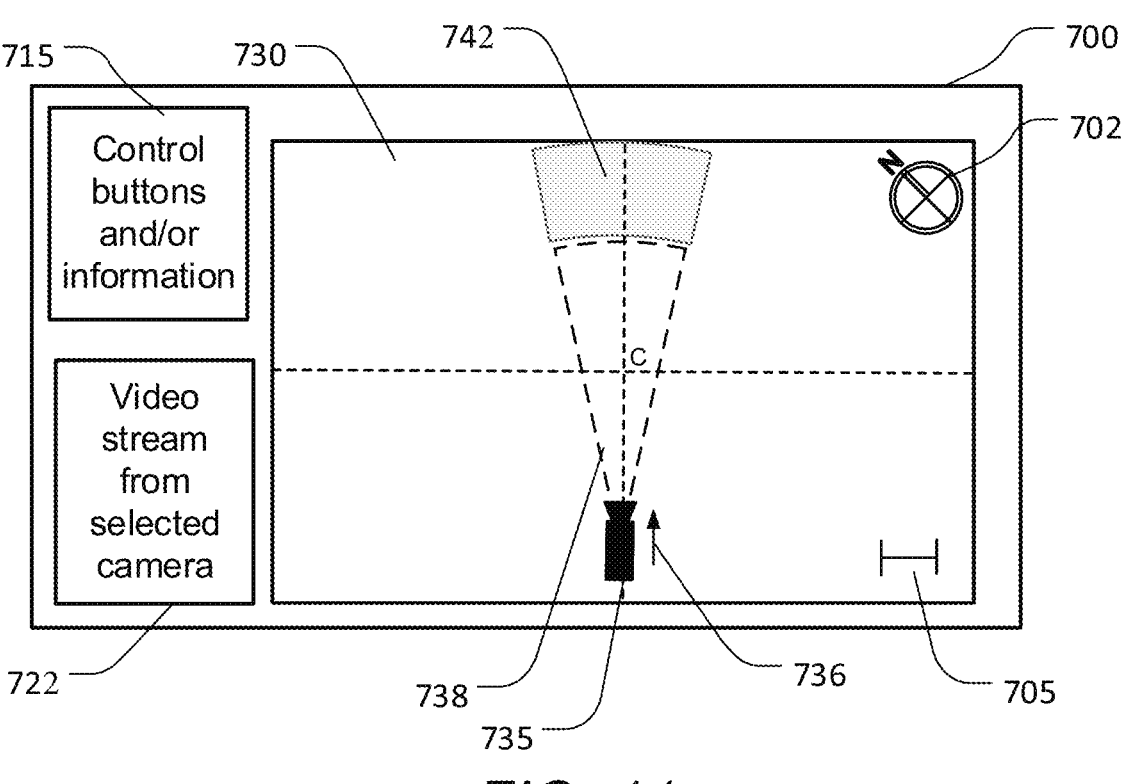

FIG. 11 illustrates in schematic form an exemplary graphical user interface (GUIs) of a VMS according to some embodiments. The GUI 700 in FIG. 11 is similar to the one shown in FIG. 9 except that the geo-map further shows a projected FOV area 742, which is an estimate of the area that the camera is moving towards.

From the direction of movement of the selected camera at the associated time, shown by the arrow 736, which may also be shown on the geo-map for the user, the projected FOV area 742 is determined as an estimate of an area covered by the FOV of the selected camera at a later time. A processing unit within the VMS determines the projected FOV area for the selected camera and the geo-map is continuously updated in accordance with both the determined FOV and the projected FOV 742 area such that the geo-map comprises at least the extent of the FOV of the selected camera and the projected FOV area.

This provides the user with a view of the geographical area ahead of what is being shown in the video stream as the geo-map shows the geographical area that the camera view is moving towards, and which it will move into unless a change of direction is made or the camera stops moving. In FIG. 11 the camera is moving straight forward and therefore the projected FOV area is in front of the camera. On the geo-map, the projected FOV area 742 is shown as an outlined greyed area and only the part of the FOV, which is not part of the FOV at the associated time is outlined.

The geo-map shown in FIG. 11 is centred as in FIGS. 9 and 10, but in some embodiments, the geo-map may be centred in the combined area covered by the FOV of the selected camera and the projected FOV area.

FIG. 12 illustrates in schematic form an exemplary graphical user interface (GUIs) of a VMS according to some embodiments. The GUI 700 in FIG. 12 is similar to the one shown in FIG. 11. Additionally, just as it is shown in FIG. 10, the geo-map shown in FIG. 12 also displays other cameras 737 positioned within the geographical area shown in the map and outlines of their FOVs 739.

However, as the geographical area shown is greater due to the projected FOV area being shown, more cameras may be displayed to the user.

Figure 13:
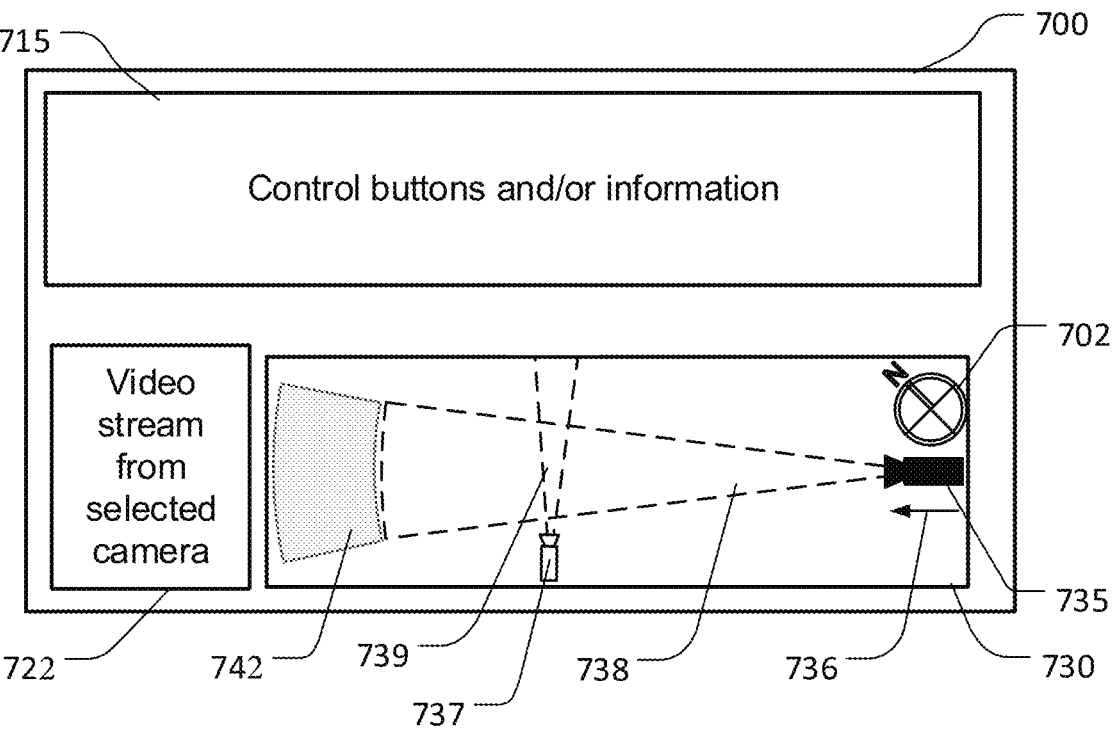

FIG. 13 illustrates in schematic form an exemplary graphical user interface (GUIs) of a VMS according to some embodiments.

The geo-map frame 730 in the GUI 700 shown in FIG. 13 is elongated, and instead of having a fixed compass bearing, the bearing of the map changes according to the orientation of the selected camera 735. The geo-map is oriented such that the central line-of-sight of the camera is pointing to one of the shorter sides of the geo-map frame. If the geo-map was oriented such that the line-of-sight was pointing up, as in FIG. 9, a large geographical area would be shown to either side of the FOV 738 of the selected camera likely with most of it being of little beneficial use to the user. This is avoided in the configuration shown in FIG. 13, wherein the geo-map displays the geographical area comprising the FOV 738, and projected FOV area 742, and some area around it, but not overly much.

A second camera 737 and its FOV 739, which overlaps with the FOV 738 of the selected camera, is also shown.

Thus, the centering and bearing of the geo-map is optimized to aid the user in seeing as much detail in the area of interest, i.e. of the FOV 738, and possibly projected FOV area 742, as possible, while still displaying an area that comprises the FOV.

Figure 14:
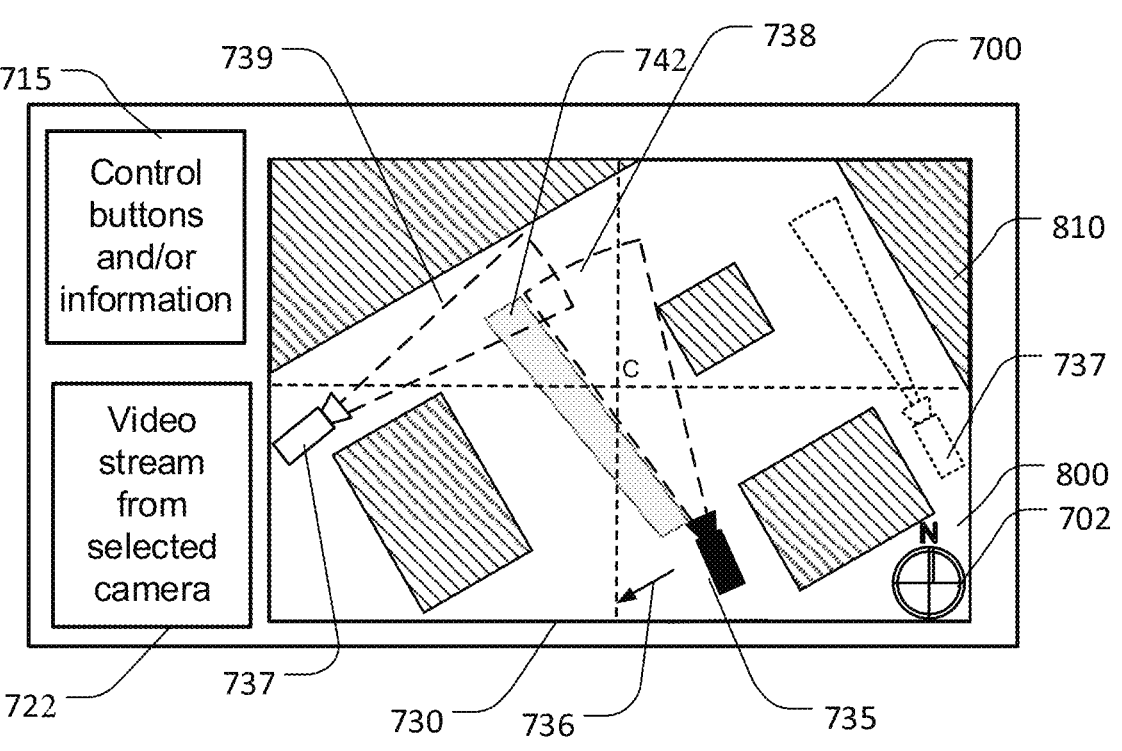

FIG. 14 illustrates in schematic form an exemplary graphical user interface (GUIs) of a VMS according to some embodiments. The GUI 700 in FIG. 14 is similar to the one shown in FIG. 12. However, the geo-map displays a map such that north in the map is always pointing up, i.e. towards the top of the display on which the GUI with the geo-map is running. Also, the selected camera 736 is now in a geographical area, where it is moving along a road 800 and where there are buildings 810, which may block the camera's view. To account for this, an adjusted FOV may be determined as described in connection with FIG. 15.

In FIG. 14 the selected video camera 735 is moving sideways as shown by the arrow 736 and therefore the projected FOV area 742 is shown to that side of the illustrated FOV 738 of the selected camera.

The geo-map frame 730 shows again other cameras 737 positioned within the geographical area shown in the map and outlines of their FOVs 739. One other camera has a FOV, which overlaps with the FOV 738 of the selected camera 735, while another camera, shown as a dotted outline has a FOV that does not. In this way, the user is made aware of both cameras, but the one shown with a dotted outline is shown as likely being of less interest.

Figure 15:
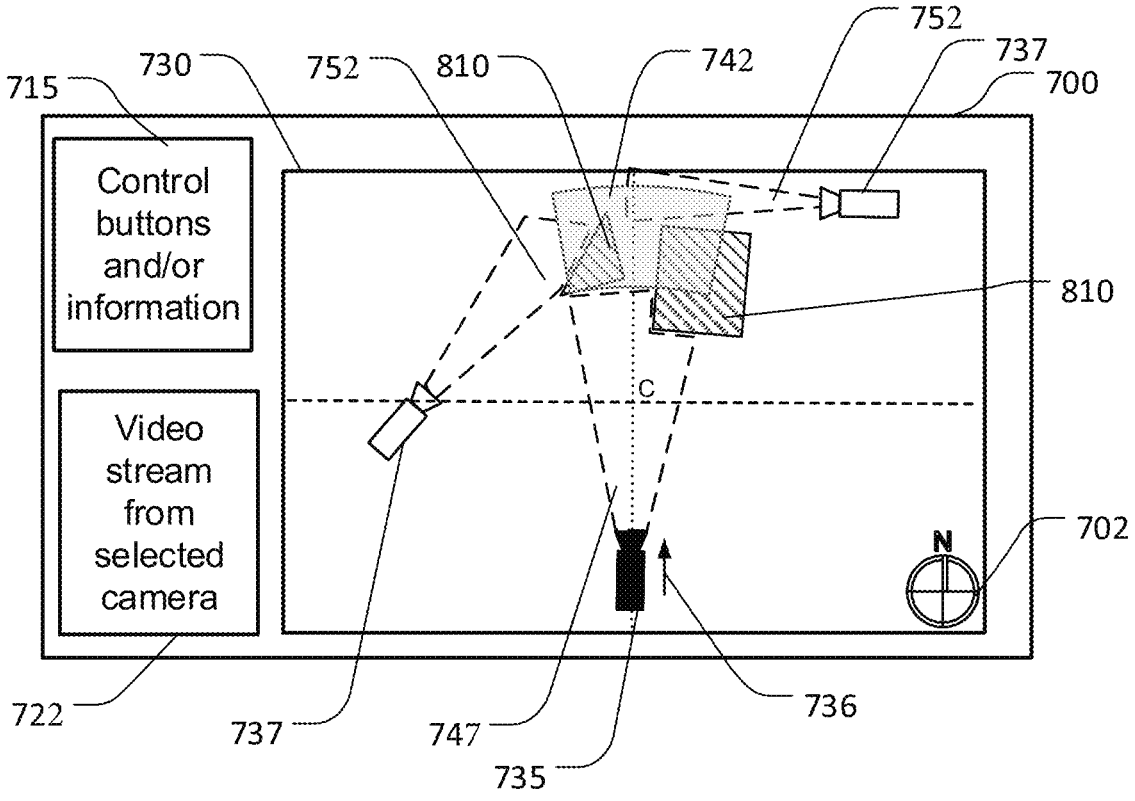

FIG. 15 illustrates in schematic form an exemplary graphical user interface (GUIs) of a VMS according to some embodiments. The GUI 700 in FIG. 15 is similar to the one shown in FIG. 14. The selected camera 736 is in a geographical area with an open area 800 and with structures, such as buildings 810 that are blocking part of the FOV of the selected camera. To account for this, an adjusted FOV 747 may be determined by a processing unit within the VMS based on FOV data and on Geographic Information System (GIS) data. The adjusted FOV indicates unobscured FOV and/or limited-visibility FOV such that areas, which are not visible or only has limited visibility anyway can be visualised as such and possibly disregarded, for example as discussed further above. Thus, the GUI 700 in FIG. 15 is configured accordingly such that the geo-map comprises at least the extent of the adjusted FOV 747 of the selected camera instead of also showing blocked or low-visibility areas of the FOV. Alternatively, the geo-map may show the area of the FOV, but use graphics to illustrate, which areas of the FOV are not visible or have low visibility.

Thus, the part(s) of the FOV of the camera for which the line of sight is interrupted by one or more structures described in the GIS data can be accounted for by the FOV being adjusted to not include the areas beyond the interrupted line of sight or to mark one or more areas as having limited visibility. This may provide the user with a more correct view of the geographical area within the view of the selected video camera.

Likewise, an adjusted FOV 752 for other cameras 737 within the geographical areas shown in the geo-map can be determined and a graphical representation provided for the user of the VMS.

Figure 16A:
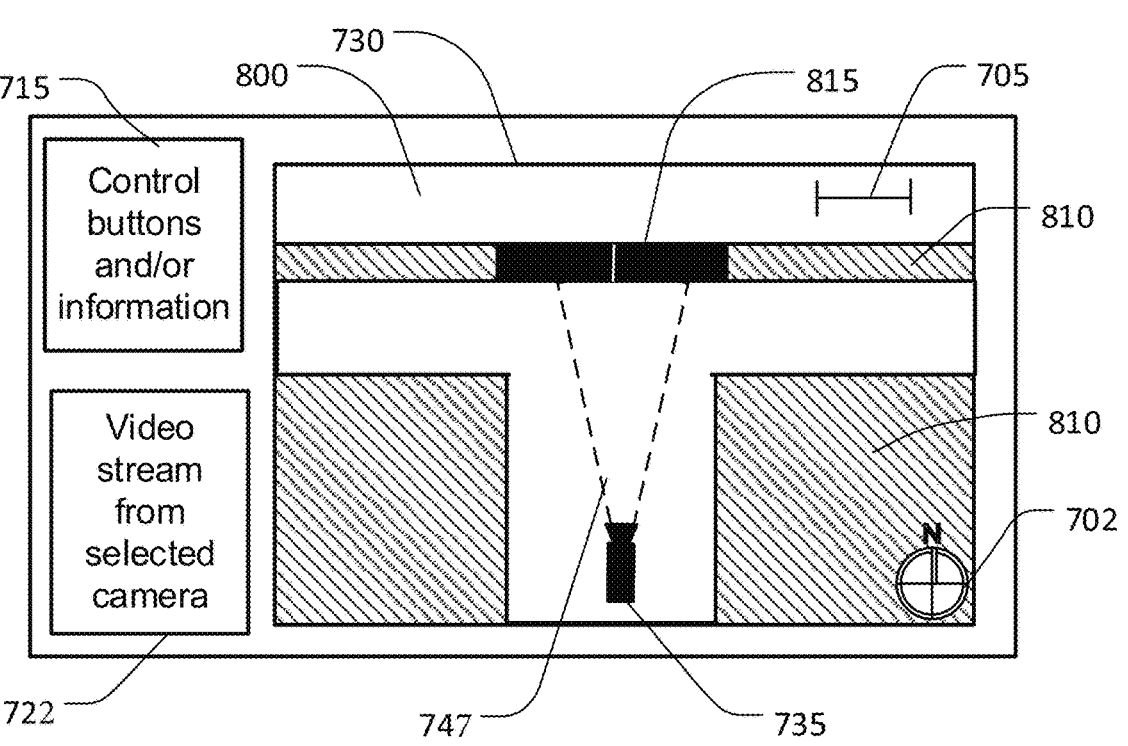
Figure 16B:
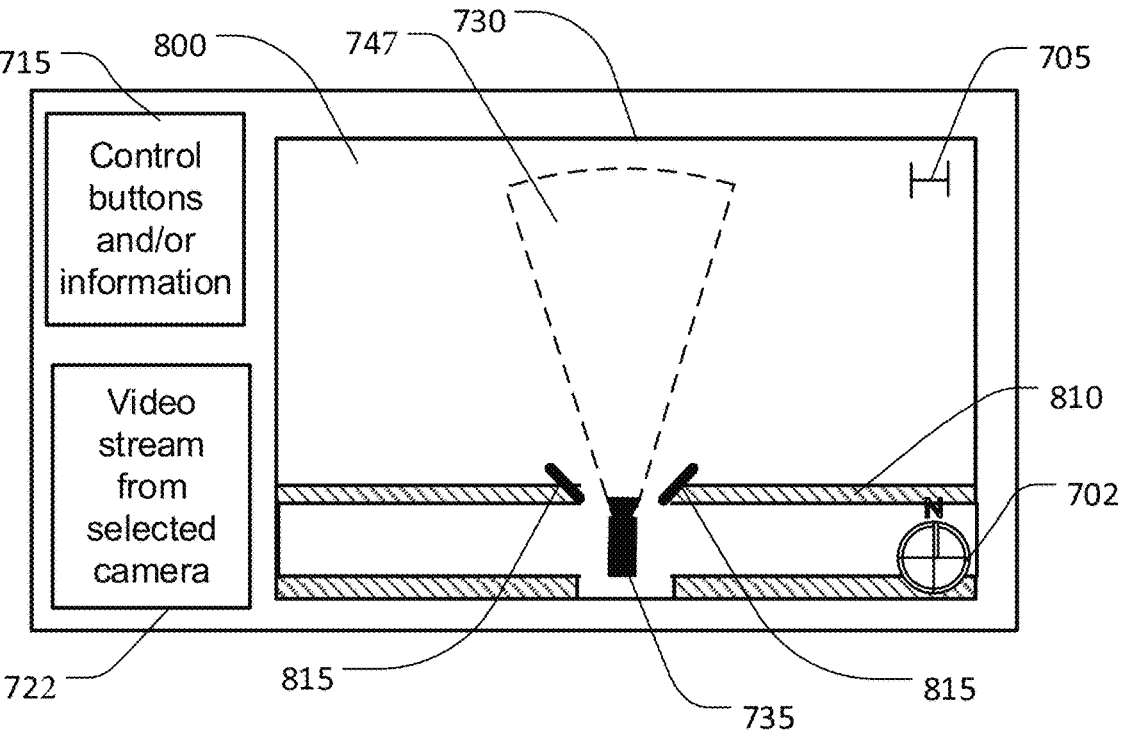

FIGS. 16A and 16B illustrate in schematic form an exemplary graphical user interface (GUIs) of a VMS according to some embodiments. The GUI 700 in FIGS. 16A and 16B are similar to the one shown in FIG. 15.

The selected camera 735 is moving in an area, where several structures 810 are blocking its line-of-sight, decreasing the area that is visible to the video camera. In front of the camera 735 is a door 815 that is closed off and leading to an open area 800 beyond the door.

An adjusted FOV 747 of the selected camera 735 has been determined as described in connection with FIG. 15 and the geo-map is shown comprising the adjusted FOV without regard to the part of the FOV that is not visible to the camera due to the structural parts 810 and 815.

A distance scale 705 shown in the geo-map frame provides scale for the map.

In FIG. 16B, the selected camera 735 has passed through the doors 815 shown in FIG. 16A. The doors 815 are shown as open although this is not necessarily known from the data available to the VMS, but when the camera has passed beyond the doors 815, there are no known structures, which block the FOV and the map zooms out to show a larger geographical area comprising the adjusted FOV 747, which is now the same as the unadjusted FOV. The distance scale 705 in FIG. 16B has therefore adjusted compared to in FIG. 16A to reflect the scale for the map shown.

Figure 17:
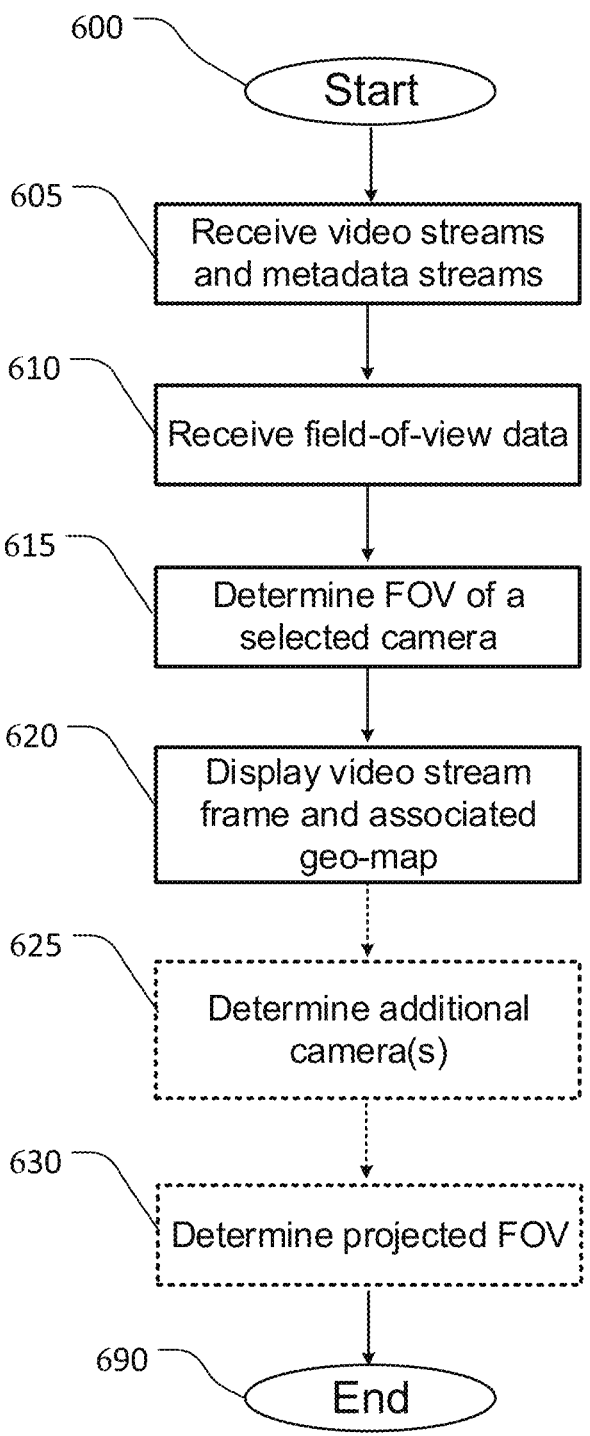
FIGS. 17-18 show flow diagrams of a computer-implemented video management method according to some embodiments.

FIG. 17 shows a flow diagram of a computer-implemented video management method according to some embodiments.

In step 605, a video management system receives a plurality of metadata streams, and associated with a plurality of video streams, respectively. Each video stream is supplied by, or associated with, respective ones of a plurality of video cameras.

In step 610, FOV data is obtained. Each of the metadata streams may comprise FOV data. Additionally, FOV data may be obtained from other sources. The FOV data comprise at least one of: position and orientation of each camera, and image sensor and lens information of each camera.

In step 615, a processing unit comprised in the video management system determines the FOV associated with each video stream, where the determination is based on the FOV data at a time associated with the displayed video frame.

In step 620, a user interface (UI) client comprised in the VMS and configured to provide a graphical user interface (GUI) provides GUI instructions for the display of the video stream of a selected camera and a geo-map. The geo-map comprises an icon representing the selected camera at a camera map position and the geo-map is continuously updated such that the geo-map comprises at least the extent of the FOV of the selected camera. A graphical representation of the FOV of the selected camera may be displayed on the geo-map.

Optionally, in step 625, one or more additional video cameras positioned within, or having a FOV that is at least partially within, the geographical area of the geo-map are determined. Representative icons are displayed on the geo-map at respective camera map positions. A graphical representation of the FOV of the one or more additional video cameras may be displayed on the geo-map.

Optionally, in step 630, the direction of movement of the selected camera at the associated time is determined and from this a projected FOV area is determined, where the projected FOV area is an estimate of the FOV of the selected camera at a later time. A graphical representation of the projected FOV area may be displayed on the geo-map.

Steps may be performed in a different order than shown in FIG. 17 as some steps do not depend on each other in the illustrated order.

Figure 18:
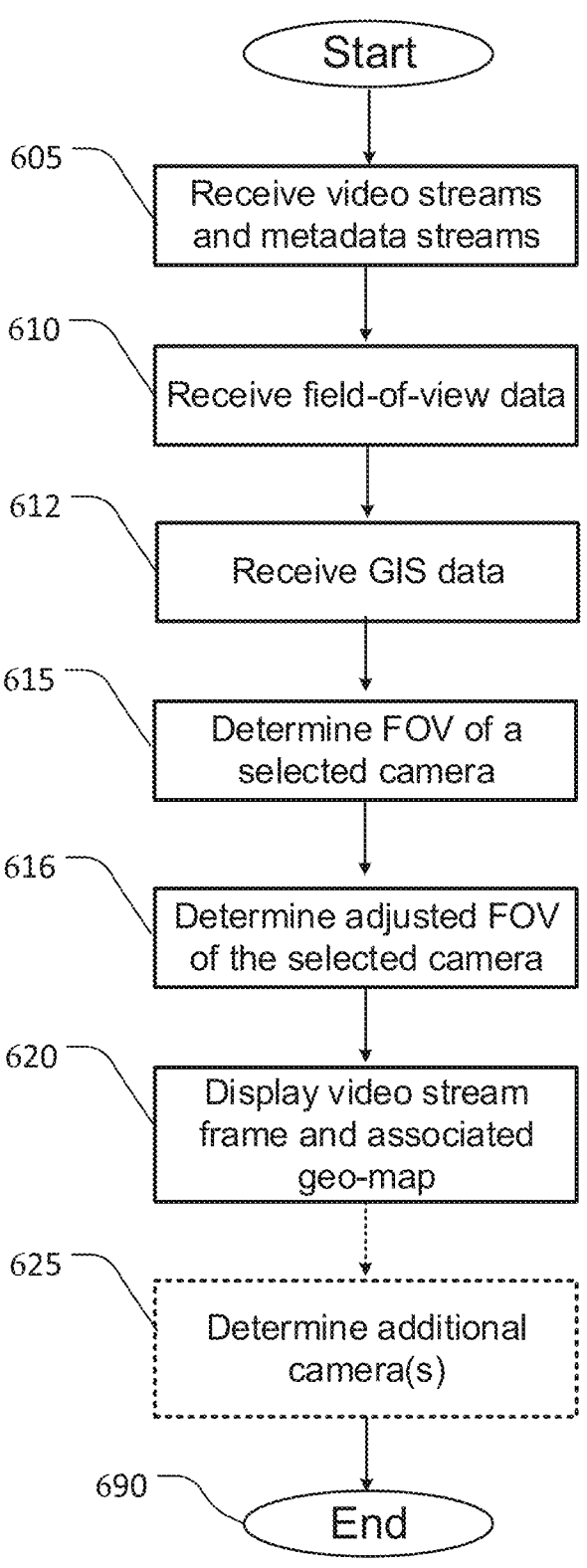

FIG. 18 shows a flow diagram of a computer-implemented video management method according to some embodiments. Steps that are also shown in FIG. 17 are as described above in connection with FIG. 17.

In step 612, GIS data associated with the position of the selected camera is received.

In step 616, an adjusted FOV associated with the video stream of the selected camera is determined, where the determination is based on the FOV data obtained in step 610 and on the GIS data obtained in step 612, and where the adjusted FOV indicates unobscured FOV and/or limited-visibility FOV. These steps may be same or similar to those discussed above in relation to FIG. 4, e.g. step 505 and 510.

Instead of, or in addition to, displaying the FOV on the geo-map, the adjusted FOV may be displayed on the geo-map. The geo-map may be configured to comprise at least the extent of the adjusted FOV of the selected camera instead of the geo-map comprising at least the extent of the FOV.

Optional steps 625 described in connection with FIG. 17 may comprise determining an adjusted FOV of the one or more additional video cameras, and a graphical representation of the adjusted FOV of the one or more additional video cameras may be displayed on the geo-map.

Figure 19A:
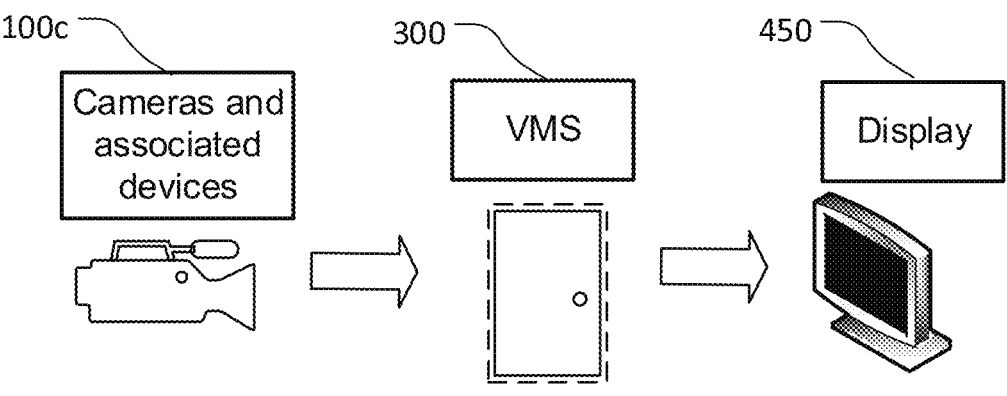
FIGS. 19A and 19B show swim lane diagrams of a computer-implemented video management method according to some embodiments.
Figure 19B:
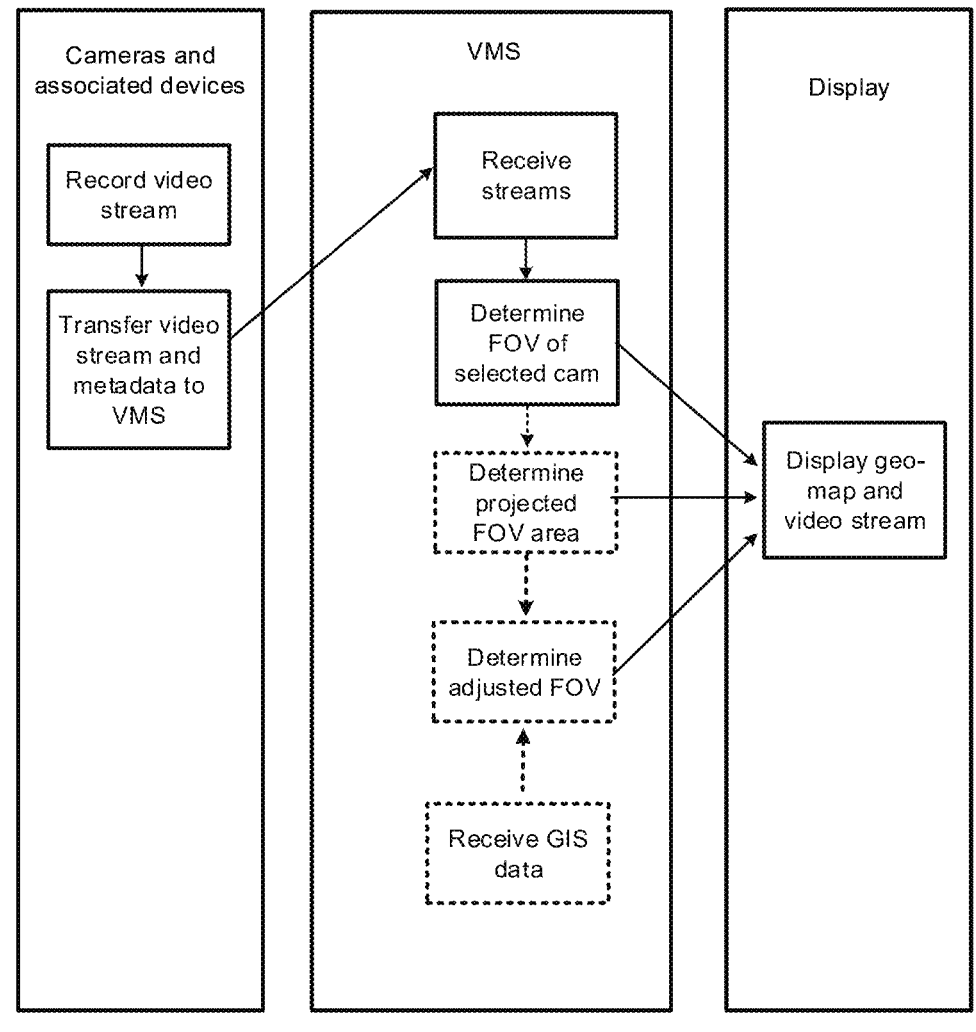

FIGS. 19A and 19B show swim lane diagrams of a computer-implemented video management method according to some embodiments. The diagrams illustrate the sharing of data to and from the VMS.

In FIG. 19A is illustrated how a plurality of cameras 100c and associated devices, e.g. a GPS device, generate respective video streams and metadata streams, possibly bound to timestamps. The video streams and metadata streams are provided to a VMS 300 as disclosed herein. Each camera of the plurality of video cameras comprise, or is associated with, a position detecting device and an orientation detecting device configured to add position metadata and orientation metadata, respectively, to each of the respective video streams.

The VMS 300 comprises a User Interface (UI) client, which provides the necessary instructions for display of a Graphical User Interface (GUI) on a display 450 receiving data from the UI client.

The VMS 300 may act as a subsystem within a video surveillance system.

In FIG. 19B illustrates in detail how the VMS 300 receives and shares data. Each column shown corresponds to the elements shown and described in connection with FIG. 19A.

A plurality of cameras 100c record video streams. Together with metadata streams generated by components within each camera 100c or by one or more associated devices, the video streams are transferred to the VMS 300.

The VMS receives the video and metadata streams and determines the FOV of a selected camera. The video stream of the selected camera and a geo-map coordinated with the video stream is displayed on display 450 receiving instructions via a UI client comprised in the VMS 300.

Additionally, the VMS may determine a projected FOV area as described herein. The projected FOV area may be used to determine the geographic area shown, via the UI client, in the geo-map on the display 450.

Finally, the VMS may receive GIS data, and from these determine an adjusted FOV as described herein. The determined adjusted FOV may be used to determine the geographic area shown, via the UI client, in the geo-map on the display 450.

While some of the embodiments have been discussed in reference to a movable cameras 100*c*, a skilled person will realize that the techniques and processes disclosed are relevant to stationary cameras 100*a*, 100*b*.

While the present disclosure has been described with reference to embodiments, it is to be understood that the present disclosure is not limited to the disclosed embodiments. The present disclosure can be implemented in various forms without departing from the principal features of the present disclosure as defined by the claims. Such variations may derive, in particular, from combining aspects of the present disclosure or one or more elements or features of the embodiments discussed in the above disclosure and/or in the appended claims.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The word "comprising" does not necessarily exclude other elements or steps, and the indefinite article "a" or "an" does not necessarily exclude a plurality. A single processing unit or multiple processing units or other unit may fulfil the functions of several items recited in the claims. The mere fact that different features are recited in mutually different dependent claims does not indicate that a combination of these features cannot be advantageously used. Any reference signs in the claims should not be construed as limiting the scope of the disclosure.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processor or processing unit.

LIST OF REFERENCES

10 Surveillance system
100*a*, 100*b* Stationary video camera(s)
100*c* Movable video camera(s)
102*c* GPS device
110*c* FOV of video camera
200 Wired or wireless communication links/connections
300 VMS
310 Camera drivers (CD)
311 Inputted video streams
320 Recording server (RS)
330 Index server (IS)
340 Metadata repository (metadb)
350 Media repository (mediadb)
360 Interface
400 UI Client
450 Display
500-540 Method steps
600-690 Method steps
700 GUI
702 Compass
705 Distance scale
710 GUI frame with search query
715 Frame with control buttons and/or information
720 GUI frame with listing of search results
722 Frame with video stream from selected camera
730 GUI frame with geo-map
735 Selected camera
736 Direction of movement of selected camera

737 Non-selected camera positioned within geo-map view
737' Non-selected camera positioned outside of geo-map view
738 FOV of selected camera
739 FOV of non-selected cameras
739' FOV of non-selected camera partially within geo-map
740 Icon or thumbnail search result
742 Projected FOV area of selected camera
745 Icon or thumbnail search result showing target
747 Adjusted FOV of selected camera
750 GUI frame with video frame or video stream
752 Adjusted FOV of non-selected camera
800 Road, open area, or unobstructed view
810/811 Building, structures, or obstructed view
815 Door
830 Obscured area of FOV
840 Target object
850 Partially obscuring object
860 Fully obscuring object
870 Limited visibility area of FOV
880 Adjusted FOV
C Centre of geo-map

The invention claimed is:

1. A video management system (VMS) for use in a surveillance system comprising:
   a recording server configured for receiving and storing a plurality of metadata streams, the metadata streams being associated with a plurality of video streams, respectively, each video stream being supplied by, or associated with, respective ones of a plurality of video cameras; and
   a processing unit configured to receive data via a data communication interface, and further configured to:
   receive GIS data associated with a position of each video camera of the plurality of video cameras;
   receive field-of-view (FOV) data associated with each video stream of the plurality of video streams, the FOV data comprising: position and orientation of each video camera of the plurality of video cameras, and image sensor and lens information of each video camera of the plurality of video cameras; and
   determine an adjusted FOV associated with each video stream of the respective video camera, the determination being based on the FOV data and on the GIS data, where the adjusted FOV of each video stream indicates unobscured FOV and/or limited-visibility FOV of the area covered by the FOV of the respective video camera.

2. The video management system (VMS) according to claim 1, wherein the recording server is further configured for receiving and storing the plurality of video streams with which the plurality of metadata streams is associated, respectively.

3. The video management system (VMS) according to claim 1, wherein the VMS comprises means for receiving and storing the adjusted FOV for later retrieval.

4. The video management system (VMS) according to claim 1, wherein the metadata for the orientation of each camera comprises one or more of: compass direction, relative pan, and relative tilt.

5. The video management system (VMS) according to claim 1, wherein the processing unit is further configured to:
   receive a search query comprising a target location or target area; and search the adjusted FOV to identify a subset of the plurality of video streams for which the adjusted FOV comprises the target location or target area.

6. The video management system (VMS) according to claim 5, wherein the processing unit is further configured to:
receive a target time or a target time interval as part of the search query; and
perform the search with the further limitation that the target location or target area is comprised within the adjusted FOV at the target time or within the target time interval.

7. The video management system (VMS) according to claim 5, wherein the processing unit is further configured to:
receive at least one of: a target object, a target activity and a target incident as part of the search query; and perform the search with the further limitation the target object and/or target activity and/or target incident is identified within the adjusted FOV of the plurality of video streams and/or respective metadata.

8. The video management system (VMS) according to claim 7, wherein the processing unit is further configured to perform the search in the identified subset of the plurality of video streams and/or respective associated metadata streams.

9. The video management system (VMS) according to claim 5, wherein the VMS further comprises a user interface (UI) client configured to provide a graphical user interface (GUI), and wherein the UI client is configured to display to a user via the GUI:
a geo-map of a selected area comprising the target position or target area; and
search results of the identified subset of the plurality of video streams as an icon or thumbnail on the geo-map, wherein the icon or thumbnail position on the geo-map is representative of the camera position from which the respective video stream within the subset was recorded.

10. The video management system (VMS) according to claim 1, wherein the UI client is further configured to display, on a geo-map, the adjusted FOV of each camera.

11. The video management system (VMS) according to claim 1, wherein the processing unit is further configured to update the determined adjusted FOV associated with each video stream whenever the FOV data associated with respective video camera indicates a change in at least one field of the FOV data.

12. The video management system (VMS) according to claim 11, wherein the indicated change is more than a minimum predetermined value.

13. The video management system (VMS) according claim 1, wherein the processing unit is further configured to update the determined adjusted FOV associated with each video stream for each timestamp of each video stream.

14. A video surveillance system comprising:
a plurality of video cameras arranged in a surveillance area and configured to generate respective video streams, wherein each camera of the plurality of video cameras comprise, or is associated with, a position detecting device and an orientation detecting device configured to add position metadata and orientation metadata, respectively, to each of the respective video streams; and
the video management system (VMS) according to claim 1.

15. A computer-implemented video management method for a video management system (VMS), comprising steps:
a) receive, at a video management system, a plurality of metadata streams and associated with a plurality of video streams, respectively, each video stream being supplied by, or associated with, respective ones of a plurality of video cameras;
b) receive, at a processing unit comprised in the video management system, GIS data associated with a position of each video camera of the plurality of video cameras;
c) receive, by the processing unit, field-of-view (FOV) data associated with each video steam of the plurality of video streams, where the FOV data comprises position and orientation of each video camera of the plurality of video cameras, and image sensor and lens information of each video camera of the plurality of video cameras; and
d) determine, by the processing unit, an adjusted FOV associated with each video stream of the respective video camera, the determination being based on the FOV data and on the GIS data, where the adjusted FOV of each video stream indicates unobscured FOV and/or limited-visibility FOV of the area covered by the FOV of the respective video camera.

16. The computer-implemented video management method according to claim 15, further comprising steps:
e) receive, by the video management system, a search query comprising a target location or target area; and
f) search the adjusted FOV associated with each video stream to identify a subset of the plurality of video streams for which the adjusted FOV comprises the target location or target area.

17. The computer-implemented video management method according to claim 16, further comprising steps:
g) receive a target time or a target time interval as part of the search query,
h) perform the search with the further limitation that the target location or target area is comprised within the adjusted FOV at the target time or within the target time interval.

18. The computer-implemented video management method according to any of claim 16, further comprising steps:
i) display a geo-map of a selected area comprising the target position or target area,
j) display search results of the identified subset of the plurality of video streams as an icon or thumbnail on the geo-map, wherein the icon or thumbnail position on the geo-map is representative of the camera position from which the respective video stream within the subset was recorded.

19. The computer-implemented video management method according to claim 15, further comprising step:
k) display, in a geo-map, the adjusted FOV of each camera.

20. A video management system (VMS) comprising:
a recording server configured for receiving and storing a plurality of video streams and associated metadata streams, each video stream being supplied by, or associated with, respective ones of a plurality of video cameras;
a user interface (UI) client configured to:
provide a graphical user interface (GUI);
display, via the GUI, the video stream of a selected camera frame-by-frame;
display, via the GUI, a geo-map; and
display an icon representative of the selected camera on the geo-map at a camera map position,
a processing unit configured to receive data via a data communication interface, and further configured to:

receive field-of-view (FOV) data associated with the plurality of video streams, the FOV data comprising: position and orientation of each camera, and image sensor and lens information of each camera;

determine the FOV of the selected camera at a time associated with the displayed video frame;

determine a direction of movement of the selected camera at the associated time; and determine a projected FOV area, which is an estimate of the FOV of the selected camera at a later time, where the projected FOV area is based on the direction of movement of the selected camera, wherein the UI client is further configured to:

display, on the geo-map, a geographical area that comprises at least the extent of the projected FOV area of the selected camera, and continuously update the geo-map when at least one of the camera position and FOV data of the selected camera changes, wherein the updated geo-map comprises at least the extent of the FOV of the selected camera and the projected FOV of the selected camera.

\* \* \* \* \*